United States Patent
Hwang et al.

(10) Patent No.: US 11,696,222 B2
(45) Date of Patent: *Jul. 4, 2023

(54) METHOD AND DEVICE FOR SEARCHING FOR ACCESS POINT IN WIRELESS LAN

(71) Applicant: ELECTRONICS AND TELECOMMUNICATIONS RESEARCH INSTITUTE, Daejeon (KR)

(72) Inventors: Sung Hyun Hwang, Daejeon (KR); Igor Kim, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

This patent is subject to a terminal disclaimer.

(21) Appl. No.: 17/313,984

(22) Filed: May 6, 2021

(65) Prior Publication Data
US 2021/0266825 A1 Aug. 26, 2021

Related U.S. Application Data

(63) Continuation of application No. 16/331,123, filed as application No. PCT/KR2017/009779 on Sep. 6, 2017, now Pat. No. 11,032,758.

(30) Foreign Application Priority Data

Sep. 6, 2016 (KR) .................. 10-2016-0114663
Nov. 9, 2016 (KR) .................. 10-2016-0148902
May 8, 2017 (KR) .................. 10-2017-0057141

(51) Int. Cl.
H04W 48/16 (2009.01)
H04W 52/02 (2009.01)
(Continued)

(52) U.S. Cl.
CPC .......... *H04W 48/16* (2013.01); *H04W 48/10* (2013.01); *H04W 52/02* (2013.01);
(Continued)

(58) Field of Classification Search
CPC ............ H04W 48/16; H04W 52/0225; H04W 52/0235
See application file for complete search history.

(56) References Cited

U.S. PATENT DOCUMENTS

| 2012/0057506 A1* | 3/2012 | Kumar | H04L 12/12 370/255 |
| 2013/0223419 A1* | 8/2013 | Ghosh | H04W 52/0235 370/338 |

(Continued)

FOREIGN PATENT DOCUMENTS

WO WO2013089747 6/2013

OTHER PUBLICATIONS

Search Report dated Dec. 21, 2017 for PCT Application No. PCT/KR2017/009779.
(Continued)

*Primary Examiner* — Jael M Ulysse

(57) ABSTRACT

A method and a device for searching for an access point in a wireless LAN are disclosed. An operating method of a station comprising a PCR and a WUR comprises the steps of: allowing the WUR operating in a wake up state to receive a WUR beacon frame from an access point; shifting an operating state of the PCR from a sleep state to the wake up state, when the WUR beacon frame is received; and allowing the PCR operating in the wake up state to communicate with the access point. Therefore, the performance of a communication system can be improved.

9 Claims, 12 Drawing Sheets

(51) Int. Cl.
*H04W 48/10* (2009.01)
*H04W 84/12* (2009.01)

(52) U.S. Cl.
CPC ....... *H04W 52/0225* (2013.01); *H04W 84/12* (2013.01); *Y02D 30/70* (2020.08)

(56) References Cited

U.S. PATENT DOCUMENTS

| | | | |
|---|---|---|---|
| 2013/0229959 A1* | 9/2013 | Ghosh | H04W 74/08 370/311 |
| 2014/0112226 A1* | 4/2014 | Jafarian | H04W 52/0229 370/311 |
| 2014/0112229 A1* | 4/2014 | Merlin | H04L 5/0055 370/311 |
| 2014/0126442 A1 | 5/2014 | Jafarian et al. | |
| 2014/0219149 A1 | 8/2014 | Kim et al. | |
| 2015/0036576 A1* | 2/2015 | Jafarian | H04W 52/0212 370/311 |
| 2015/0078229 A1* | 3/2015 | Choi | H04W 56/001 370/329 |
| 2015/0103714 A1 | 4/2015 | Lee et al. | |
| 2015/0139207 A1 | 5/2015 | Seok | |
| 2015/0208349 A1* | 7/2015 | Ramamurthy | H04W 52/0212 370/311 |
| 2015/0223047 A1 | 8/2015 | Abraham et al. | |
| 2015/0334650 A1 | 11/2015 | Park | |
| 2015/0334654 A1* | 11/2015 | Choi | H04W 52/0216 370/311 |
| 2016/0057605 A1 | 2/2016 | Shellhammer et al. | |
| 2016/0183187 A1* | 6/2016 | Park | H04W 52/0229 370/311 |
| 2016/0242115 A1 | 8/2016 | Jafarian et al. | |
| 2016/0353382 A1* | 12/2016 | Xue | H04W 52/0251 |
| 2016/0374019 A1 | 12/2016 | Park et al. | |
| 2017/0026907 A1 | 1/2017 | Min et al. | |
| 2017/0181090 A1* | 6/2017 | Park | H04L 27/26 |
| 2018/0020501 A1* | 1/2018 | Aboul-Magd | H04L 27/2603 |
| 2018/0063788 A1* | 3/2018 | Yang | H04W 12/108 |
| 2019/0320388 A1* | 10/2019 | Li | H04W 52/0235 |

OTHER PUBLICATIONS

Park, et al., "LP-WUR (Low-Power Wake-Up Receiver) Follow-Up," IEEE 802.11-16/0341r0, 2016, pp. 11.
Park et al., "LP-WUR (Low-Power Wake-Up Receiver): Enabling Low-Power and Low-Latency Capability for 802.11," ieee 802.11-16/0027r0, 2016, pp. 1-21.
Seok, et al., "Coexistence Mechanism for Wakeup Radio Signal," IEEE 802.11-16/1114r0, 2016, pp. 13.
Wilhelmsson et al., "Discussion of Duty-Cycled Wake-Up Receivers," IEEE 802.11-16/0968r0, 2016, pp. 1-12.
Wilhelmsson et al., "Discussion of Duty-Cycled Wake-Up Receivers", IEEE 802.11-16/0968r0, Jul. 2016.

* cited by examiner

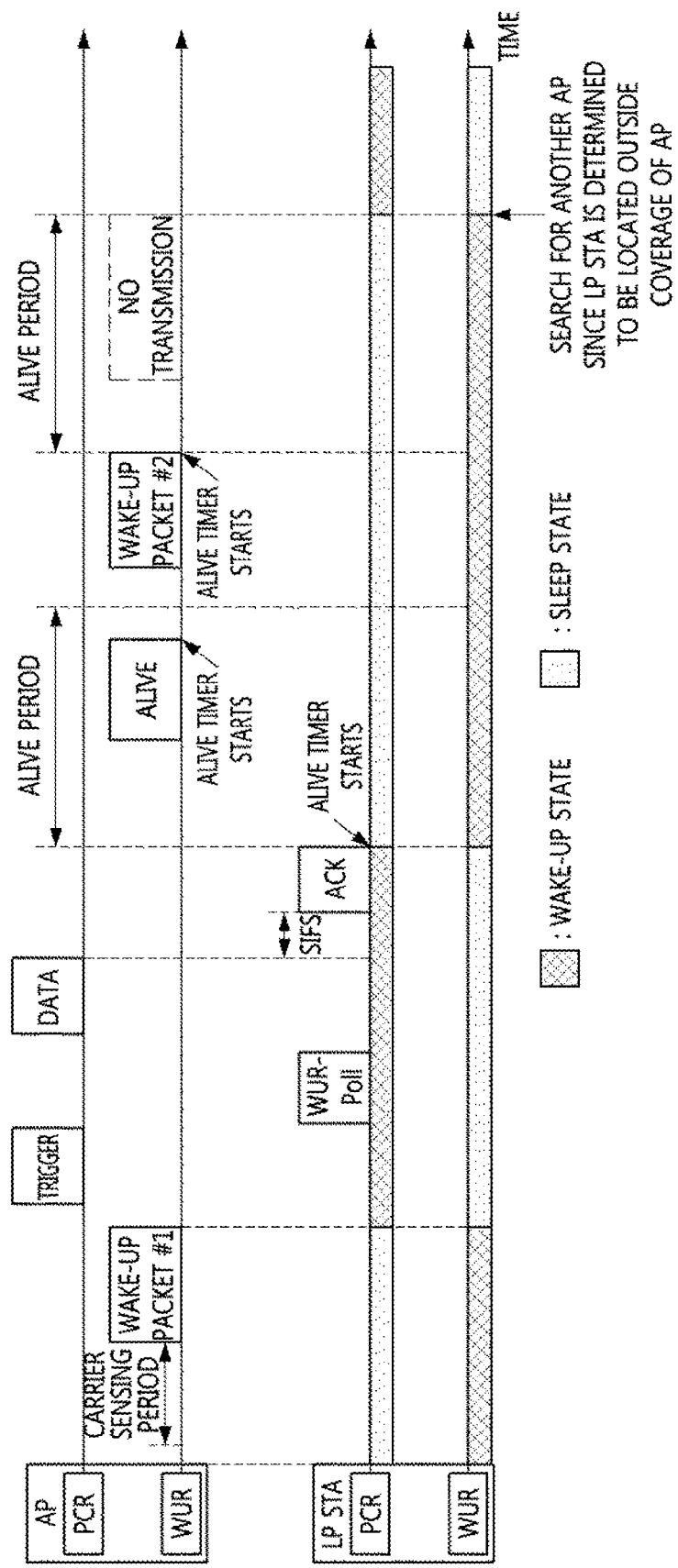

METHOD AND DEVICE FOR SEARCHING FOR ACCESS POINT IN WIRELESS LAN

CROSS-REFERENCE TO RELATED APPLICATIONS

This application is a continuation of U.S. patent application Ser. No. 16/331,123, filed Mar. 6, 2019, which is a U.S. National Phase of International Application No. PCT/KR2017/009779, filed Sep. 6, 2017, which claims priority to Korean Patent Application Nos. 10-2016-0114663, filed Sep. 6, 2016, 10-2016-0148902, filed Nov. 9, 2016, and 10-2017-0057141, filed May 8, 2017.

TECHNICAL FIELD

The present invention relates to a wireless local area network (WLAN) technology, and more particularly, to a technique for searching an access point for a station supporting a low-power operation in a WLAN.

BACKGROUND ART

With the development of information and communications technology, various wireless communication technologies are under development. Among these wireless communication technologies, a WLAN enables wireless connection to the Internet at a home or business, or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. The IEEE 802.11a provides a transmission speed of 54 Mbps using an unlicensed band at 5 GHz. The IEEE 802.11b provides a transmission speed of 11 Mbps using direct sequence spread spectrum (DSSS) at 2.4 GHz. The IEEE 802.11g provides a transmission speed of 54 Mbps using orthogonal frequency division multiplexing (OFDM) at 2.4 GHz.

The WLAN technology according to the IEEE 802.11n standard operates in the 2.4 GHz band and the 5 GHz band based on an orthogonal frequency division multiplexing (OFDM) scheme, and when multiple input multiple output (MIMO)-OFDM is used, a transmission speed of up to 300 Mbps can be provided through four spatial streams. Also, the WLAN technology according to the IEEE 802.11n standard can support a channel bandwidth of up to 40 MHz and can provide a transmission speed of up to 600 Mbps in this case.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band. Also, the WLAN technology according to the IEEE 802.11ax standard aims at improving the frequency efficiency in a dense environment.

Since a communication node (e.g., access point (AP), station (STA), etc.) supporting the WLAN technology operates dependently on the battery, a low-power operation method will be required to operate for a long time. In order to support the low-power operation, the communication node may include a transceiver (hereinafter, referred to as a 'wake-up radio (WUR)') for the low-power operation, a transceiver (hereinafter, referred to as a 'primary connectivity radio (PCR)') for basic operations according to the IEEE 802.11, and the like.

Meanwhile, when a STA supporting the low-power operation (hereinafter, referred to as a 'low-power STA') is out of the coverage of the access point, the operation state of the WUR of the low-power STA may transition from the sleep state to the wake-up state, and the operation state of the PCR of the low-power STA may transition from the wake-up state to the sleep state. Thereafter, even when the low-power STA is within the coverage of the access point, the low-power STA may determine that the low-power STA is still out of the coverage of the access point until the WUR of the low-power STA receives a low-power operation related signal from the access point. In this case, the communications between the low-power STA and the access point may be delayed.

DISCLOSURE

Technical Problem

The objective of the present invention to solve the above-described problem is to provide methods for searching an access point for a station supporting a low-power operation in a WLAN.

Technical Solution

In order to achieve the above-described objection, an operation method of a station comprising a primary connectivity radio (PCR) and a wake-up radio (WUR) according to a first embodiment of the present invention may comprise receiving, by The WUR operating in a wake-up state, a WUR beacon frame from an access point; when the WUR beacon frame is received, transitioning an operation state of the PCR from a sleep state to a wake-up state; and performing, by the PCR operating in the wake-up state, communications with the access point.

The WUR beacon frame may be a management frame among frames (e.g., management frame, control frame, data frame) which are transmitted from the WUR. The WUR beacon frame may include a legacy preamble and a WUR physical convergence layer protocol (PCLP) protocol data unit (PPDU).

The legacy preamble may be configured with a 20 MHz frequency band, and the WUR PPDU may be configured with a frequency band less than 20 MHz.

The WUR PPDU may be duplicated on a frequency axis, or a plurality of WUR PPDUs including the WUR PPDU may be multiplexed on a frequency axis.

The station may operate in a normal mode or in a WUR mode, the PCR may operate in the wake-up state and the WUR may operate in the wake-up state or the sleep state when the station operates in the normal mode, and the PCR may operate in the wake-up state or the sleep state and the WUR may operate in the wake-up state when the station operates in the WUR mode.

The operation parameters for the WUR mode may be determined according to a signaling procedure by the PCR.

The operation parameters may include at least one of information indicating whether the access point supports the station operating in the WUR mode and information indicating a duration in which the station operates in a WUR duty-cycle mode.

The operation parameters may include at least one of information indicating a channel through which a WUR frame is transmitted, information indicating whether the WUR supports a duty-cycle mode operation, information indicating a duty-cycle duration of the WUR, information indicating an ON/OFF ratio in the duty-cycle duration of the WUR, information indicating a channel access scheme of the WUR frame, information indicating whether a PS-Poll protocol is supported for the WUR frame, information indicating a time required for transitioning the operation state of the PCR from the sleep state to the wake-up state, information indicating a WUR alive period for identifying whether the station is located within a coverage of the access point, and information indicating a service provider operating the access point.

The operation method may further comprise, when a legacy frame is not received from the access point during a predetermined interval, transitioning the operation state of the PCR from the wake-up state to the sleep state.

In order to achieve the above-described objection, an operation method of an access point according to a second embodiment of the present invention may comprise generating a wake-up radio (WUR) beacon frame including a legacy frame and a WUR physical convergence layer protocol (PCLP) protocol data unit (PPDU); and transmitting the WUR beacon frame, wherein the legacy preamble is transmitted through a 20 MHz frequency band, and the WUR PPDU is transmitted a frequency band less than 20 MHz.

The station performing communications with the access point may operate in a normal mode or in a WUR mode, a primary connectivity radio (PCR) may operate in a wake-up state and a wake-up radio (WUR) may operate in the wake-up state or a sleep state when the station operates in the normal mode, and the PCR may operate in the wake-up state or the sleep state and the WUR may operate in the wake-up state when the station operates in the WUR mode, and the operation parameters for the WUR mode may be determined according to a signaling procedure by a PCR of the access point.

The operation parameters may include at least one of information indicating whether the access point supports the station operating in the WUR mode and information indicating a duration in which the station operates in a WUR duty-cycle mode.

The operation parameters may include at least one of information indicating a channel through which a WUR frame is transmitted, information indicating whether the WUR supports a duty-cycle mode operation, information indicating a duty-cycle duration of the WUR, information indicating an ON/OFF ratio in the duty-cycle duration of the WUR, information indicating a channel access scheme of the WUR frame, information indicating whether a PS-Poll protocol is supported for the WUR frame, information indicating a time required for transitioning the operation state of the PCR from the sleep state to the wake-up state, information indicating a WUR alive period for identifying whether the station is located within a coverage of the access point, and information indicating a service provider operating the access point.

In order to achieve the above-described objection, a station in a WLAN-based communication system according to a third embodiment of the present invention may comprise a processor, a primary connectivity radio (PCR) operating according to a control of the processor, a wake-up radio (WUR) operating according to a control of the processor, and a memory storing at least one instruction executed by the processor, and the at least one instruction may be configured to receive, by The WUR operating in a wake-up state, a WUR beacon frame from an access point; when the WUR beacon frame is received, transition an operation state of the PCR from a sleep state to a wake-up state; and perform, by the PCR operating in the wake-up state, communications with the access point.

The WUR beacon frame may include a legacy preamble and a WUR physical convergence layer protocol (PCLP) protocol data unit (PPDU).

The legacy preamble may be configured with a 20 MHz frequency band, and the WUR PPDU may be configured with a frequency band less than 20 MHz.

The station may operate in a normal mode or in a WUR mode, the PCR may operate in the wake-up state and the WUR may operate in the wake-up state or the sleep state when the station operates in the normal mode, and the PCR may operate in the wake-up state or the sleep state and the WUR may operate in the wake-up state when the station operates in the WUR mode.

The operation parameters for the WUR mode may be determined according to a signaling procedure by the PCR.

The operation parameters may include at least one of information indicating whether the access point supports the station operating in the WUR mode and information indicating a duration in which the station operates in a WUR duty-cycle mode.

The operation parameters may include at least one of information indicating a channel through which a WUR frame is transmitted, information indicating whether the WUR supports a duty-cycle mode operation, information indicating a duty-cycle duration of the WUR, information indicating an ON/OFF ratio in the duty-cycle duration of the WUR, information indicating a channel access scheme of the WUR frame, information indicating whether a PS-Poll protocol is supported for the WUR frame, information indicating a time required for transitioning the operation state of the PCR from the sleep state to the wake-up state, information indicating a WUR alive period for identifying whether the station is located within a coverage of the access point, and information indicating a service provider operating the access point.

Advantageous Effects

According to the present invention, in the WLAN-based communication system, the access point can transmit a wake-up radio (WUR) beacon frame. Since the low-power STA located outside the coverage of the access point cannot receive the WUR beacon frame from the access point, the primary connectivity radio (PCR) of the low-power STA can operate in a sleep state and the wake-up radio (WUR) of the low-power STA can operate in a wake-up state. That is, when the WUR beacon frame is not received from the access point, the low-power STA may determine that the low-power STA is located outside the coverage of the access point.

On the other hand, the low-power STA located within the coverage of the access point can receive the WUR beacon frame from the access point, and can determine that the low-power STA is located within the coverage of the access point when the WUR beacon frame is received. In this case, the operation state of the PCR of the low-power STA can transition from the sleep state to the wake-up state, and the operation state of the WUR of the low-power STA can transition from the wake-up state to the sleep state. Thus, the low-power STA (e.g., the PCR of the low-power STA) may perform communications (e.g., the access procedure between the low-power STA and the access point, the frame transmission and reception procedure between the low-power STA and the access point, and the like) with the access point. Accordingly, the performance of the communication system can be improved.

DESCRIPTION OF DRAWINGS

FIG. 14 is a timing chart illustrating a first embodiment of an operation method of a communication node in a WLAN-based communication system.

MODES OF THE INVENTION

Figure 1:
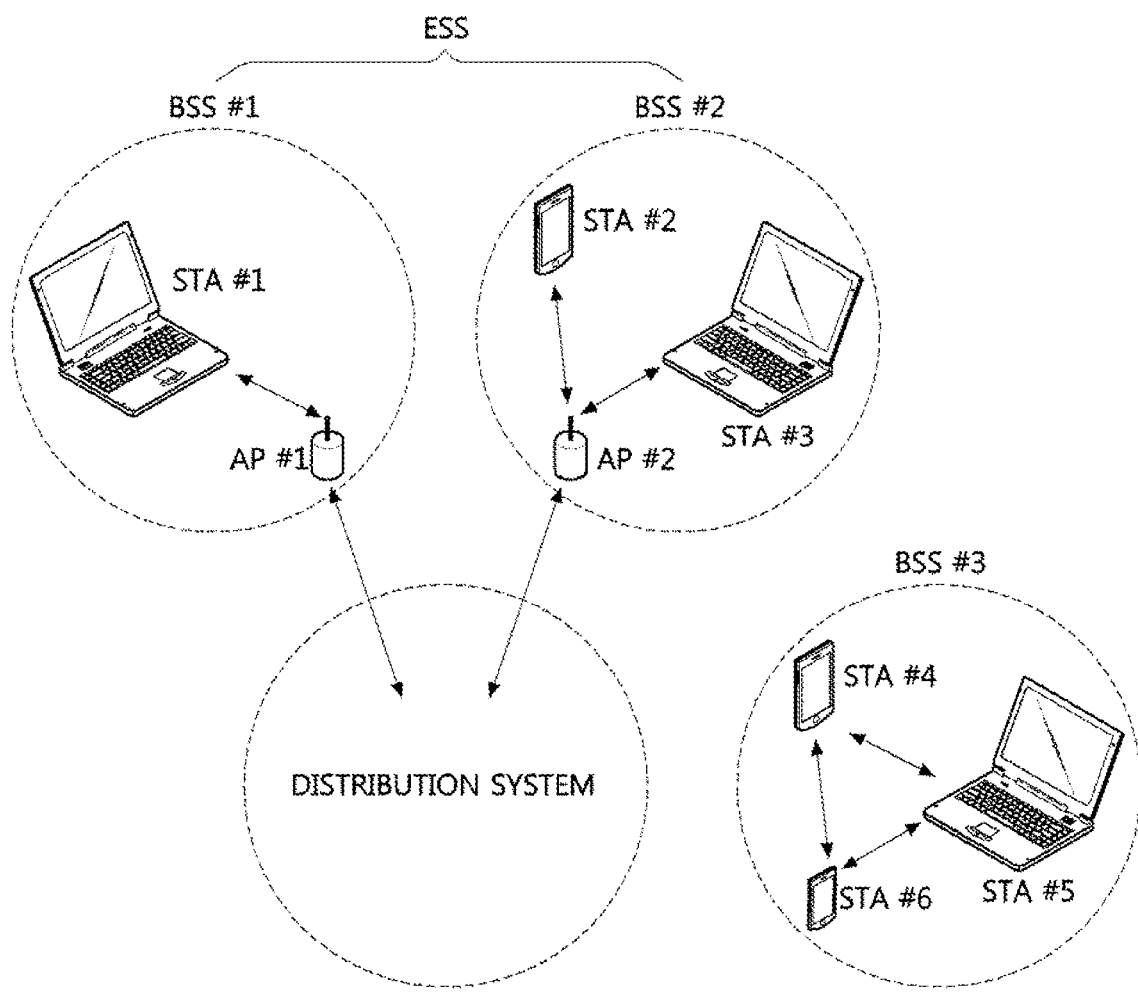
FIG. 1 is a conceptual diagram illustrating a first embodiment of a WLAN-based communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Embodiments described in the present specification may be applied to a communication system (e.g., a wireless local area network (WLAN) based communication system) according to the Institute of Electrical and Electronics Engineers (IEEE) 802.11 standard. Also, the embodiments described in the present specification may be applied to other communication systems as well as the communication systems conforming to the IEEE 802.11 standard. For example, the embodiments described in the present specification may be applied to wireless personal area network (WPAN) based communication systems, wireless body area network (WBAN) based communication systems, 4G communication systems (e.g., long term evolution (LTE) based communication system, LTE-Advanced (LTE-A) based communication system), 5G communication system (e.g., new radio (NR) communication system), or the like.

In the WLAN-based communication system, a station (STA) may refer to a communication node performing functions of a medium access control (MAC) layer and functions of a physical layer on a wireless medium which are defined in the IEEE 802.11 standard. The STA may be classified into an access point (AP) STA and a non-AP STA. The AP STA may simply be referred to as an access point, and the non-AP STA may simply be referred to as a station. Also, the AP may be referred to as a base station (BS), a node B, an evolved node B, a relay, a radio remote head (RRH), a transmission and reception point (TRP), or the like. The station may be referred to as a terminal, a wireless transmit/receive unit (WTRU), a user equipment (UE), a device, or the like and may be a smart phone, a tablet PC, a laptop computer, a sensor device, or the like.

FIG. 1 is a conceptual diagram illustrating a first embodiment of a WLAN based communication system.

Referring to FIG. 1, a WLAN based communication system according to the IEEE 802.11 standard may include at least one basic service set (BSS). The BSS may indicate a set of communication nodes (e.g., APs #1-2, STAs #1-6, etc.). The BSS may be classified into an infrastructure BSS and an independent BSS (IBSS). Here, each of BSSs #1-2 may be an infrastructure BSS, and the BSS #3 may be an IBS S.

The BSS #1 may include a STA #1, an AP #1 connected to a distribution system, and the like. Also, the BSS #1 may further include the distribution system. The communications between the STA #1 and the AP #1 may be performed based on the IEEE 802.11 standard in the BSS #1. The BSS #2 may include a STA #2, a STA #3, an AP #2 connected to a distribution system, and the like. Also, the BSS #2 may further include the distribution system. The communications between the STA #2 and the AP #2, the communications between the STA #3 and the AP #2, and the like may be performed based on the IEEE 802.11 standard in the BSS #2. The communications between STAs (e.g., STAs #1-3) in the BSS #1 or BSS #2 may be performed through the AP (e.g., APs #1-2). However, when a direct link is established between STAs (e.g., STA #1-3), direct communications between the STAs (e.g., STA #1-3) may be performed.

The BSS #3 may be an IBSS operating in an ad-hoc mode. There may not be an AP which is an entity that performs a management function in the BSS #3. In the BSS #3, STAs (e.g., STAs #4-6) may be managed in a distributed manner. The STAs (e.g., STAs #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., APs #1-2, STAs #1-3) included in the ESS may communicate with each other, and STAs (e.g., STA #1-3) belonging to the same ESS may move between BSSs (e.g., BSSs #1-2) while performing seamless communications.

The communication node (e.g., AP, STA, etc.) belonging to the WLAN based communication system may be configured as follows.

Figure 2:
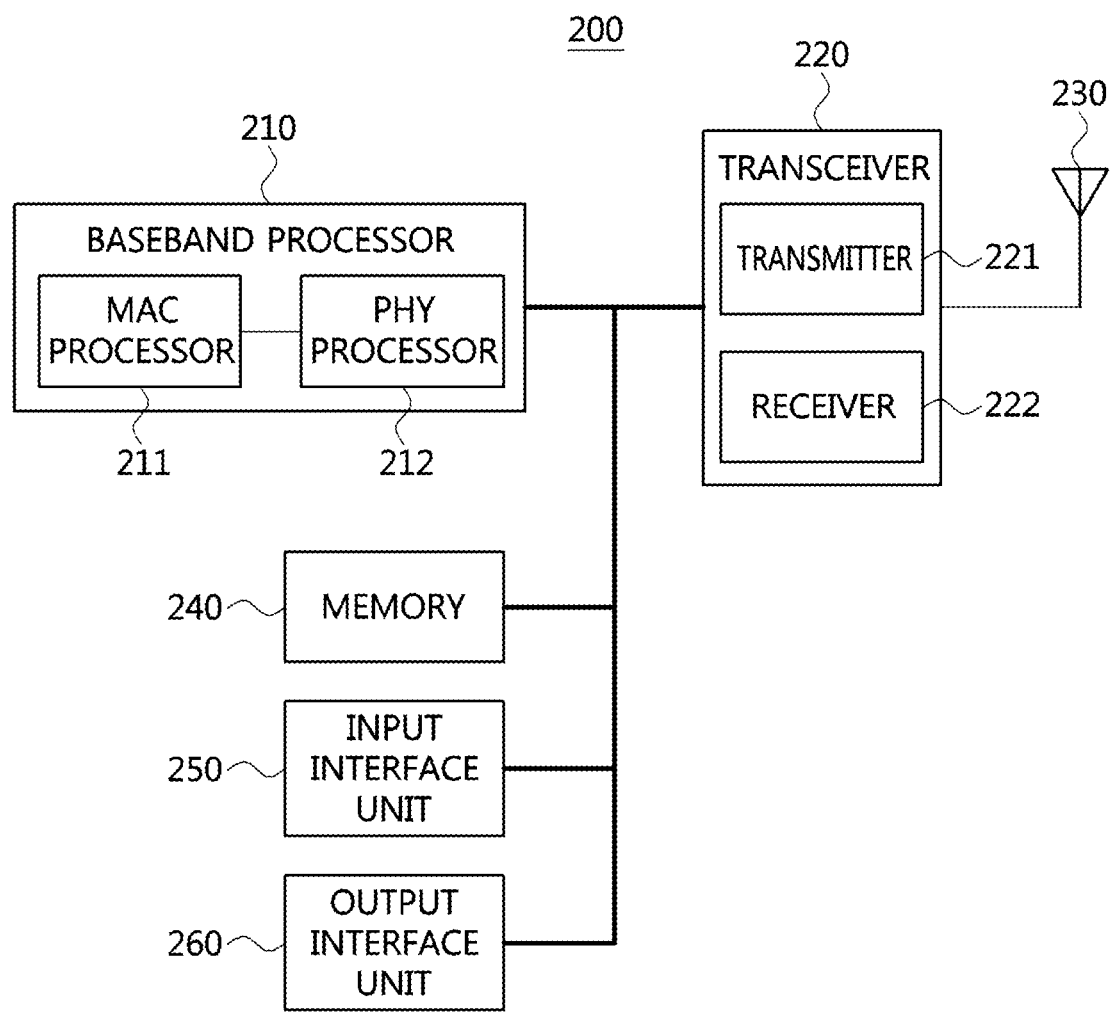
FIG. 2 is a block diagram illustrating a first embodiment of a communication node constituting a WLAN-based communication system.

FIG. 2 is a block diagram illustrating a first embodiment of a communication node belonging to a WLAN based communication system.

Referring to FIG. 2, a communication node 200 may include a baseband processor 210, a transceiver 220, an antenna 230, a memory 240, an input interface unit 250, an output interface unit 260, and the like. The baseband processor 210 may perform baseband-related signal processing, and may include a MAC processor 211 and a PHY processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250 and the output interface unit 260 may be connected to each other via a bus.

Meanwhile, the communication node (e.g., AP, STA, etc.) belonging to the WLAN based communication system may perform transmission and reception of a frame based on a point coordination function (PCF), a hybrid coordination function (HCF), a HCF controlled channel access (HCCA) function, an enhanced distributed channel access (EDCA) function, or the like.

In the WLAN based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

Figure 3:
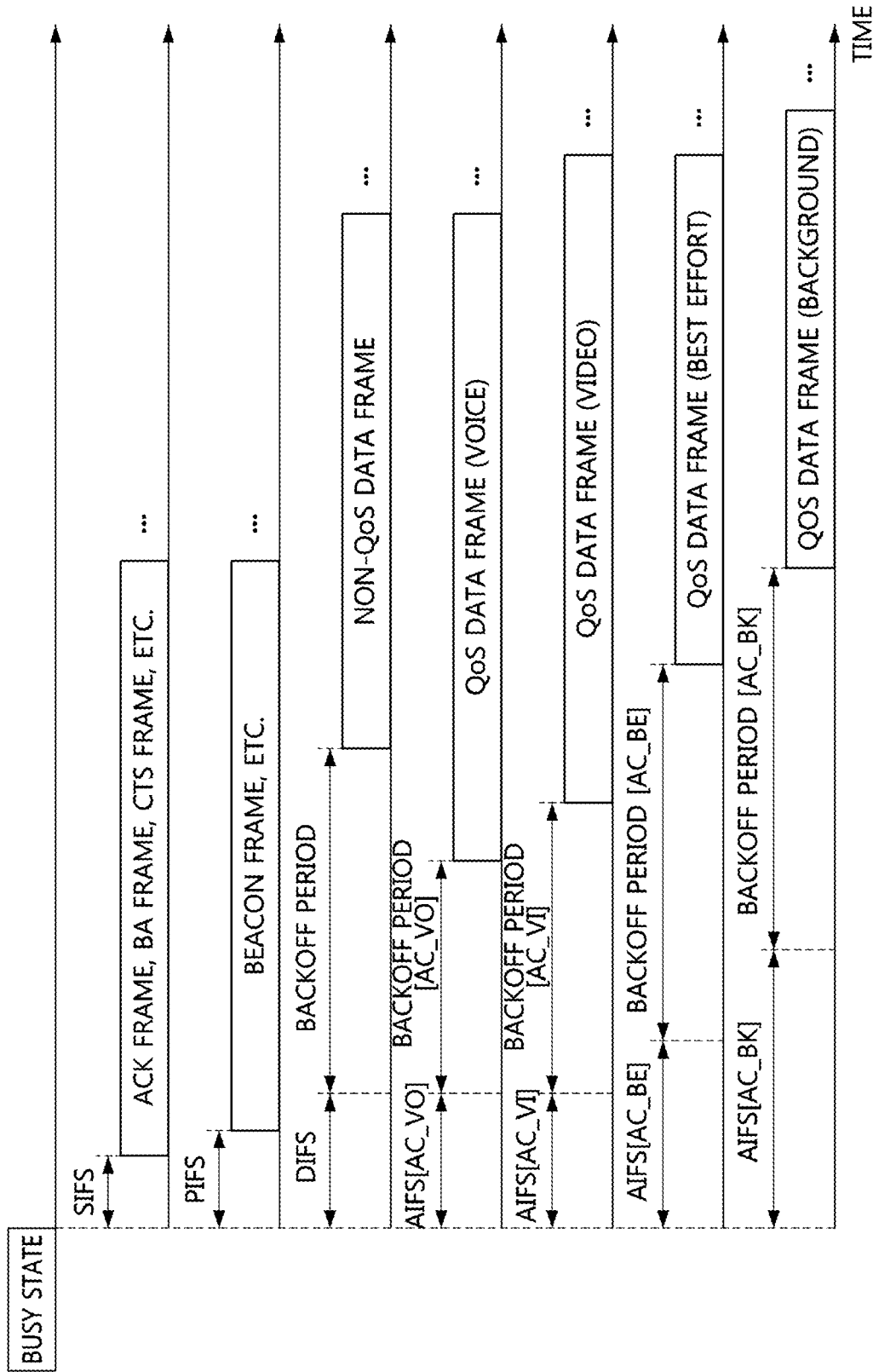
FIG. 3 is a timing diagram illustrating a first embodiment of an operation method of a communication node based on EDCA.

FIG. 3 is a timing diagram illustrating a first embodiment of an operation method of a communication node based on EDCA.

Referring to FIG. 3, a communication node desiring to transmit a control frame (or a management frame) may perform a channel state monitoring operation (e.g., carrier sensing operation) during a predetermined period (e.g., short interframe space (SIFS) or PCF IFS (PIFS)), and when the channel state is determined to be idle during the predetermined period (e.g., SIFS or PIFS), the communication node may transmit the control frame (or the management frame). For example, the communication node may transmit an ACK frame, a BA frame, a CTS frame, or the like when the channel state is determined to be idle during SIFS. Also, the communication node may transmit a beacon frame or the like when the channel state is determined to be idle during the PIFS. On the other hand, when it is determined that the channel state is busy during the predetermined period (e.g., SIFS or PIFS), the communication node may not transmit the control frame (or the management frame). Here, the carrier sensing operation may refer to a clear channel assessment (CCA) operation.

A communication node desiring to transmit a non-QoS data frame may perform a channel state monitoring operation (e.g., carrier sensing operation) during DCF IFS (DIFS), and when the channel state is determined to be idle during the DIFS, the communication node may perform a random backoff procedure. For example, the communication node may select a backoff value (e.g., a backoff counter) within a contention window according to the random backoff procedure and may perform a channel state monitoring operation (e.g., carrier sensing operation) during a period corresponding to the selected backoff value (hereinafter, referred to as 'backoff period'). The communication node may transmit the non-QoS data frame when the channel state is determined to be idle during the backoff period.

A communication node desiring to transmit a QoS data frame may perform a channel state monitoring operation (e.g., carrier sensing operation) during an arbitration IFS (AIFS), and when the channel state is determined to be idle during the AIFS, the communication node may perform a random backoff procedure. The AIFS may be configured according to an access category (AC) of a data unit (e.g., protocol data unit (PDU)) included in the QoS data frame. The AC of the data unit may be as shown in Table 1 below.

TABLE 1

| Priority | AC | Description |
| --- | --- | --- |
| Lowest | AC_BK | Background |
|  | AC_BE | Best effort |
|  | AC_VI | Video |
| Highest | AC_VO | Voice |

AC_BK may indicate background data, AC_BE may indicate data transmitted in the best effort manner, AC_VI may indicate video data, AC_VO may indicate voice data. For example, the length of the AIFS for the QoS data frame corresponding to each of AC_VO and AC_VI may be configured to be equal to the length of the DIFS. The length of the AIFS for the QoS data frame corresponding to each of AC_BE and AC_BK may be configured to be longer than the length of the DIFS. Here, the length of the AIFS for the QoS data frame corresponding to AC_BK may be configured to be longer than the length of the AIFS for the QoS data frame corresponding to AC_BE.

In the random backoff procedure, the communication node may select a backoff value (e.g., a backoff counter) within a contention window according to the AC of the QoS data frame. The contention window according to the AC may be as shown in Table 2 below. $CW_{min}$ may indicate a minimum value of the contention window, $CW_{max}$ may indicate a maximum value of the contention window, and each of the minimum value and the maximum value of the contention window may be represented by the number of slots.

TABLE 2

| AC | $CW_{min}$ | $CW_{max}$ |
| --- | --- | --- |
| AC_BK | 31 | 1023 |
| AC_BE | 31 | 1023 |
| AC_VI | 15 | 31 |
| AC_VO | 7 | 15 |

The communication node may perform a channel state monitoring operation (e.g., carrier sensing operation) during the backoff period and may transmit the QoS data frame when the channel state is determined to be idle during the backoff period.

Figure 4:
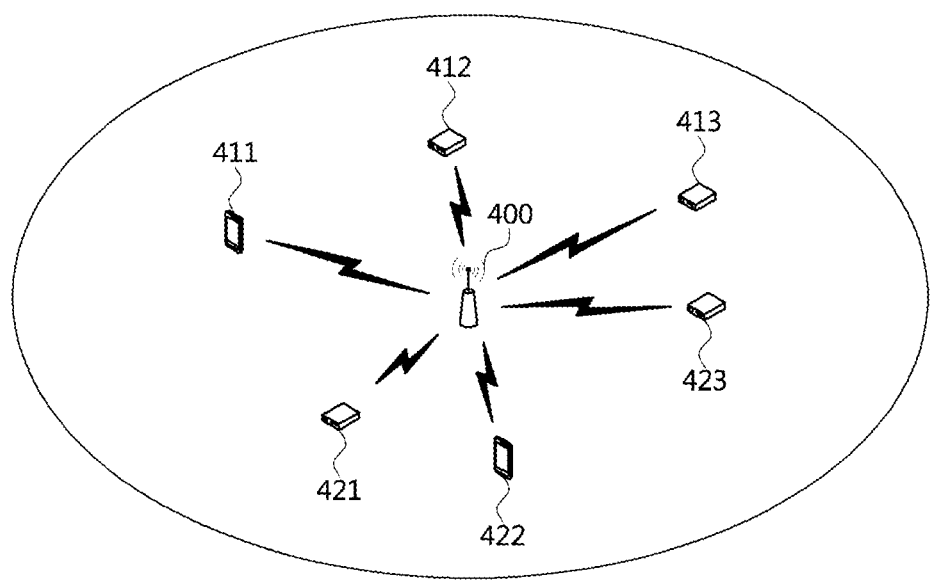
FIG. 4 is a conceptual diagram illustrating a second embodiment of a WLAN based communication system.

FIG. 4 is a conceptual diagram illustrating a second embodiment of a WLAN based communication system.

Referring to FIG. 4, a WLAN based communication system may include an AP 400, STAs supporting a low-power operation (hereinafter referred to as low-power (LP) STA') 411, 412 and 413, STAs 421, 422 and 423 which do not support the low-power operation (hereinafter referred to as 'legacy STA'), and the like. The low-power STAs 411, 412 and 413 and the legacy STAs 421, 422 and 423 may belong to coverage of the AP 400, and the AP 400 may provide communication services to the low-power STAs 411, 412 and 413 and the legacy STAs 421, 422 and 423. The low-power STA #1 411 and the legacy STA #2 422 may be smart phones, and the low-power STA #2 412, the low-power STA #3 413, the legacy STA #1 421, and the legacy STA #3 423 may be sensor devices.

The AP 400 may support communication protocols used by the low-power STAs 411, 412, and 413 and the legacy STAs 421, 422, and 423, respectively. The low-power STAs 411, 412, and 413 may use communication protocols defined in the IEEE 802.11ba standard. Also, the low-power STAs 411, 412, and 413 may use communication protocols defined in other standards such as IEEE 802.11a/b/g/n/ac/ax/ad/ay, etc. as well as the communication protocol defined in the IEEE 802.11ba standard. The legacy STAs 421, 422 and 423 may use the communication protocols defined in standards (e.g., IEEE 802.11a/b/g/n/ac/ax/ay, etc.) other than IEEE 802.11ba standard.

The legacy STAs 421, 422 and 423 may be configured the same or similar to the communication node 200 shown in FIG. 2, and the low-power STAs 411, 412 and 413 may be configured as follows.

Figure 5:
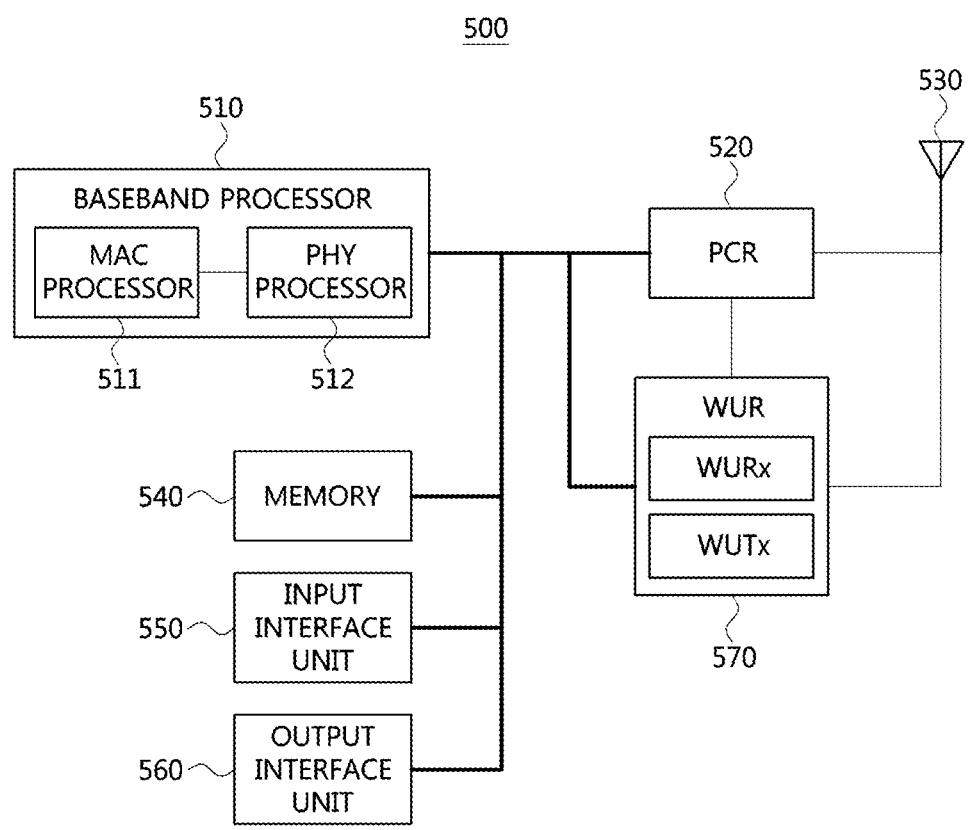
FIG. 5 is a block diagram illustrating a first embodiment of a low-power STA in a WLAN based communication system.

FIG. 5 is a block diagram illustrating a first embodiment of a low-power STA in a WLAN based communication system.

Referring to FIG. 5, a low-power STA 500 may include a baseband processor 510, a primary connectivity radio (PCR) 520, an antenna 530, a memory 540, an input interface unit 550, an output interface unit 560, a wake-up radio (WUR) 570, and the like. For example, the low-power STA 500 may further include the WUR 570 as compared to the communication node 200 of FIG. 2. The functions of each of the baseband processor 510, the PCR 520, the antenna 530, the memory 540, the input interface unit 550, and the output interface unit 560 included in the low-power STA 500 may be are the same as or similar to the functions of each of the baseband processor 210, the transceiver 220, the antenna 230, the memory 240, the input interface unit 250, and the output interface unit 260 included in the communication node 200 of FIG. 2.

The PCR 520 may perform the same or similar functions as the transceiver 220, and transmit and receive a legacy frame (e.g., a legacy signal). Also, the PCR 520 may perform the PHY layer functions. The legacy frame may be a frame configured according to the IEEE 802.11 standard (e.g., IEEE 802.11a/b/g/n/ac/ax/ay, etc.). For example, the PCR 520 may transmit and receive frames (e.g., control frames, management frames, data frames) defined in the IEEE 802.11 standard and may operate in at least one of the 2.4 GHz frequency band and the 5 GHz frequency band. Also, the PCR 520 may support 20 MHz bandwidth, 40 MHz bandwidth, 80 MHz bandwidth, 160 MHz bandwidth, or the like.

The WUR 570 may comprise at least one of a wake-up transmitted (WUTx) and a wake-up receiver (WURx). The WUTx may perform a function of transmitting a WUR frame (e.g., WUR PPDU), and the WURx may perform a function of receiving a WUR frame (e.g., WUR PPDU). The WUR 570 may be located in the PCR 520, or may be configured independently from the PCR 520. The WUR 570 and the PCR 520 may share the same antenna 530. Alternatively, the antenna for the WUR 570 may be configured separately from the antenna for the PCR 520. For example, the low-power STA 500 may comprise a first antenna (not shown) for the WUR 570 and a second antenna (not shown) for the PCR 520. The communications between the WUR 570 and the PCR 520 may be performed using primitive signals, signals according to application protocol interfaces (APIs), or the like. Also, the WUR 570 may perform the PHY layer functions.

The WUR 570 may operate in a band narrower than 20 MHz (e.g., 4 MHz, 8 MHz, 16 MHz, etc.) and the power consumption of WUR 570 may be less than 1 mW. The WUR 570 may receive a WUR frame (e.g., a wake-up packet, a WUR beacon frame, an alive frame, etc.) and may demodulate a received signal to identify information included in the received signal. The WUR frame may be modulated in an on-off keying (OOK) scheme, or may be a frame configured in accordance with the IEEE 802.11ba standard.

Each of the PCR 520 and the WUR 570 may operate in a wake-up state or a sleep state. The wake-up state may indicate a state in which power is supplied to the corresponding entity (e.g., PCR 520 or WUR 570), and may be referred to as "on state, "activation state", "enable state", "awake state", or the like. The sleep state may indicate a state in which no power or a minimum power is supplied to the corresponding entity (e.g., PCR 520 or WUR 570), and may be referred to as "off state", "deactivation state", "disable state", "doze state", or the like.

The low-power STA 500 may support two modes as shown in Table 3 below.

TABLE 3

| | PCR | WUR |
|---|---|---|
| Normal mode | Wake-up state | Sleep state |
| WUR mode | Sleep state | Wake-up state |

In the normal mode, the PCR 520 of the low-power STA 500 may operate in the wake-up state and the WUR 570 of the low-power STA 500 may operate in the sleep state. Alternatively, in the normal mode, the WUR 570 of the low-power STA 500 may operate in the wake-up state. For example, the PCR 520 operating in the wake-up state may perform transmission and reception procedures of a frame (e.g., a legacy frame or a legacy signal) with another communication node. In the WUR mode, the PCR 520 of the low-power STA 500 may operate in the sleep state and the WUR 570 of the low-power STA 500 may operate in the wake-up state. Alternatively, in the WUR mode, the PCR 520 of the low-power STA 500 may operate in the wake-up state. For example, the WUR 570 operating in the wake-up state may perform a channel state monitoring operation (e.g., carrier sensing operation) to receive a wake-up packet. Here, the wake-up packet may request the low-power STA 500 to operate in the normal mode.

When the wake-up packet is received from another communication node, the WUR 570 may transmit to the PCR 520 a wake-up indicator requesting the PCR 520 to operate in the wake-up state. When the wake-up indicator is received from the WUR 570, the operation state of the PCR 520 may transition from the sleep state to the wake-up state. When the wake-up indicator is transmitted to the PCR 520 or when the operation state of the PCR 520 transitions from the sleep state to the wake-up state, the operation state of the WUR 570 may transition from the wake-up state to the sleep state. Alternatively, the operation state of the WUR 570 may transition from the wake-up state to the sleep state when a sleep indicator requesting the WUR 570 to operate in the sleep state is received from the PCR 520. Here, a time required for the transition from the WUR mode to the normal mode may be referred to as 'mode transition time'. For example, the mode transition time may indicate a time from the reception of the wake-up packet to a time when the low-power STA operates in the normal mode. Alternatively, the mode transition time may indicate a time required for transitioning from the normal mode to the WUR mode.

When the operation of frame transmission and reception is completed, the operation state of the PCR 520 may transition from the wake-up state to the sleep state. In this case, the PCR 520 may transmit to the WUR 570 a wake-up indicator requesting the WUR 570 to operate in the wake-up state. When the wake-up indicator is received from the PCR 520, the operation state of the WUR 570 may transition from the sleep state to the wake-up state. When the wake-up indicator is transmitted to the WUR 570 or when the operation state of the WUR 570 transitions from the sleep state to the wake-up state, the operation state of the PCR 520 may transition from the wake-up state to the sleep state.

Also, the baseband processor 510 (e.g., a MAC processor 511 included in the baseband processor 510) may operate in the wake-up state or the sleep state based on the operation state of the PCR 520. For example, the baseband processor 510 (e.g., the MAC processor 511) may also operate in the wake-up state when the PCR 520 operates in the wake-up state, and the baseband processor 510 (e.g., the MAC processor 511) may also operate in the sleep state when the PCR 520 operates in the sleep state. For example, when a wake-up indicator requesting to operate in the wake-up state is received from the PCR 520 operating in the wake-up state, the operation state of the baseband processor 510 (e.g., MAC processor 511) may transition from the sleep state to the wake-up state. When a sleep indicator requesting to operate in the sleep state is received from the PCR 520 to operate in the sleep state, the operation state of the baseband processor 510 (e.g., MAC processor 511) may transition from the wake-up state to the sleep state. Alternatively, the baseband processor 510 may always operate in the wake-up state regardless of the operation state of the PCR 520.

Meanwhile, an AP supporting low-power operations may be configured the same as or similar to the low-power STA 500 described above. For example, the AP may include the baseband processor 510, the PCR 520, the antenna 530, the memory 540, the input interface unit 550, the output interface unit 560, the WUR 570, and the like. The WUR may operate in a band narrower than 20 MHz (e.g., 4 MHz, 8 MHz, 16 MHz, etc.) and the power consumption of WUR 570 may be less than 1 mW. The WUR may transmit a WUR frame (e.g., a wake-up packet, a WUR beacon frame, an alive frame, etc.). The WUR frame may be modulated in the OOK scheme, or may be a frame configured in accordance with the IEEE 802.11ba standard.

Meanwhile, in the WLAN-based communication system, a channel may be configured as follows.

Figure 6:
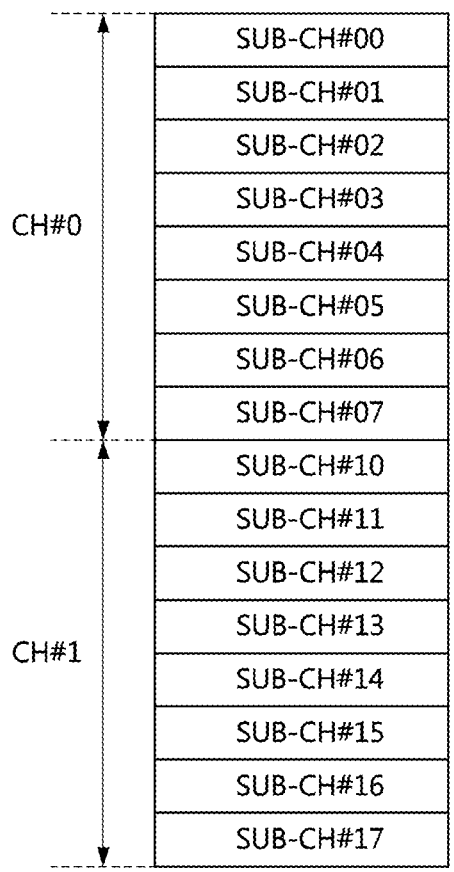
FIG. 6 is a conceptual diagram illustrating a first embodiment of a channel configuration in a WLAN based communication system.

FIG. 6 is a conceptual diagram illustrating a first embodiment of a channel configuration in a WLAN based communication system.

Referring to FIG. 6, frequency bands supported by communication nodes (e.g., access point, low-power STA, and legacy STA) in the WLAN-based communication system are 0.625 MHz, 1.25 MHz, 2.5 MHz, 5 MHz, 10 MHz, 20 MHz, 40 MHz, 80 MHz, 160 MHz, and the like. The bandwidth of one channel (CH) in the frequency band supported by the communication node may be 20 MHz. The channel may include a plurality of subchannels (SUB-CHs), and the bandwidth of each of the plurality of subchannels may be 0.625 MHz, 1.25 MHz, 2.5 MHz, 5 MHz, 10 MHz, or the like. Alternatively, the bandwidth of each of the plurality of subchannels may be 4 MHz, 8 MHz, 16 MHz, or the like. Here, the subchannel may be an RU.

Meanwhile, in the WLAN-based communication system, a WUR frame may be configured as follows.

Figure 7:
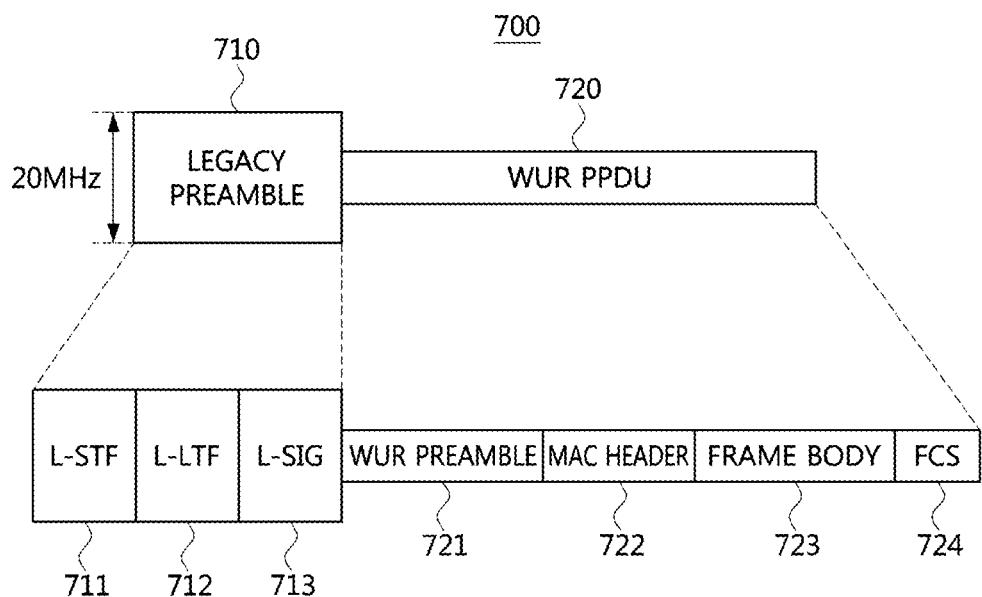
FIG. 7 is a block diagram illustrating a first embodiment of a WUR frame in a WLAN-based communication system.

FIG. 7 is a block diagram illustrating a first embodiment of a WUR frame in a WLAN-based communication system.

Referring to FIG. 7, a WUR frame 700 may include a legacy preamble 710 and a physical layer convergence protocol (PCLP) protocol data unit 720. The legacy preamble 710 may include a legacy short training field (L-STF) 711, a legacy long training field (L-LTF) 712, and a legacy signal (L-SIG). The size of the frequency band to which the legacy preamble 710 is mapped may be 20 MHz.

The WUR PPDU 720 may include a WUR preamble 721 and a WUR payload. The WUR payload of the WUR PPDU 720 may include a MAC header 722, a frame body 723, and a frame check sequence (FCS) field 724. The WUR PPDU 720 may be modulated in the OOK scheme. The size of the frequency band to which the WUR PPDU 720 is mapped may be smaller than 20 MHz. For example, the size of the frequency band to which the WUR PPDU 720 is mapped may be 4 MHz, 8 MHz, 16 MHz, or the like. The WUR PPDU 720 may be duplicated in the 20 MHz frequency band. Alternatively, a plurality of WUR PPDUs may be multiplexed on the frequency axis.

The WUR preamble 721 may include a WUR-STF, a WUR-LTF, and at least one WUR-SIG field. Also, the WUR preamble 721 may include a pseudo random (PN) sequence used for synchronization between the access point and the low-power STA (e.g., the WUR included in the low-power STA). The MAC header 722 may include a transmitter address field and a receiver address field. For example, the transmitter address field of the MAC header 722 may indicate the address of the access point transmitting the WUR frame 700, and the receiver address field of the MAC header 722 may indicate the address (e.g., MAC address, association identifier (AID), partial AID (PAID), etc.) of the low-power STA receiving the WUR frame 700. When the WUR frame 700 is transmitted in a broadcast manner, the receiver address field of the MAC header 722 may indicate a broadcast address (or, group address, group ID, etc.). When the WUR frame 700 is transmitted in a multicast manner, the receiver address field of the MAC header 722 may indicate a multicast address (or, group address, group ID, etc.).

Next, operation methods of a communication node (e.g., access points, STAs, etc.) supporting the low-power operation in the WLAN-based communication system will be described. Even when a method (e.g., transmission or reception of a frame) performed at the first communication node among the communication nodes is described, the corresponding second communication node may perform a method (reception or transmission of the frame) corresponding to the method performed at the first communication node. That is, when the operation of the station is described, the corresponding access point may perform an operation corresponding to the operation of the station. Conversely, when the operation of the access point is described, the corresponding station may perform an operation corresponding to the operation of the access point.

Also, a transmission start point and a transmission end point of a signal (e.g., frame) in a transmitting communication node may be assumed to be the same as a reception start point and a reception end point of the corresponding signal (e.g., corresponding frame) in a receiving communication node. A start point of the signal (e.g., frame) may be assumed to indicate the transmission start point or the reception start point, and an end point of the signal (e.g., frame) may be assumed to indicate the transmission end point or the reception end point.

Figure 8:
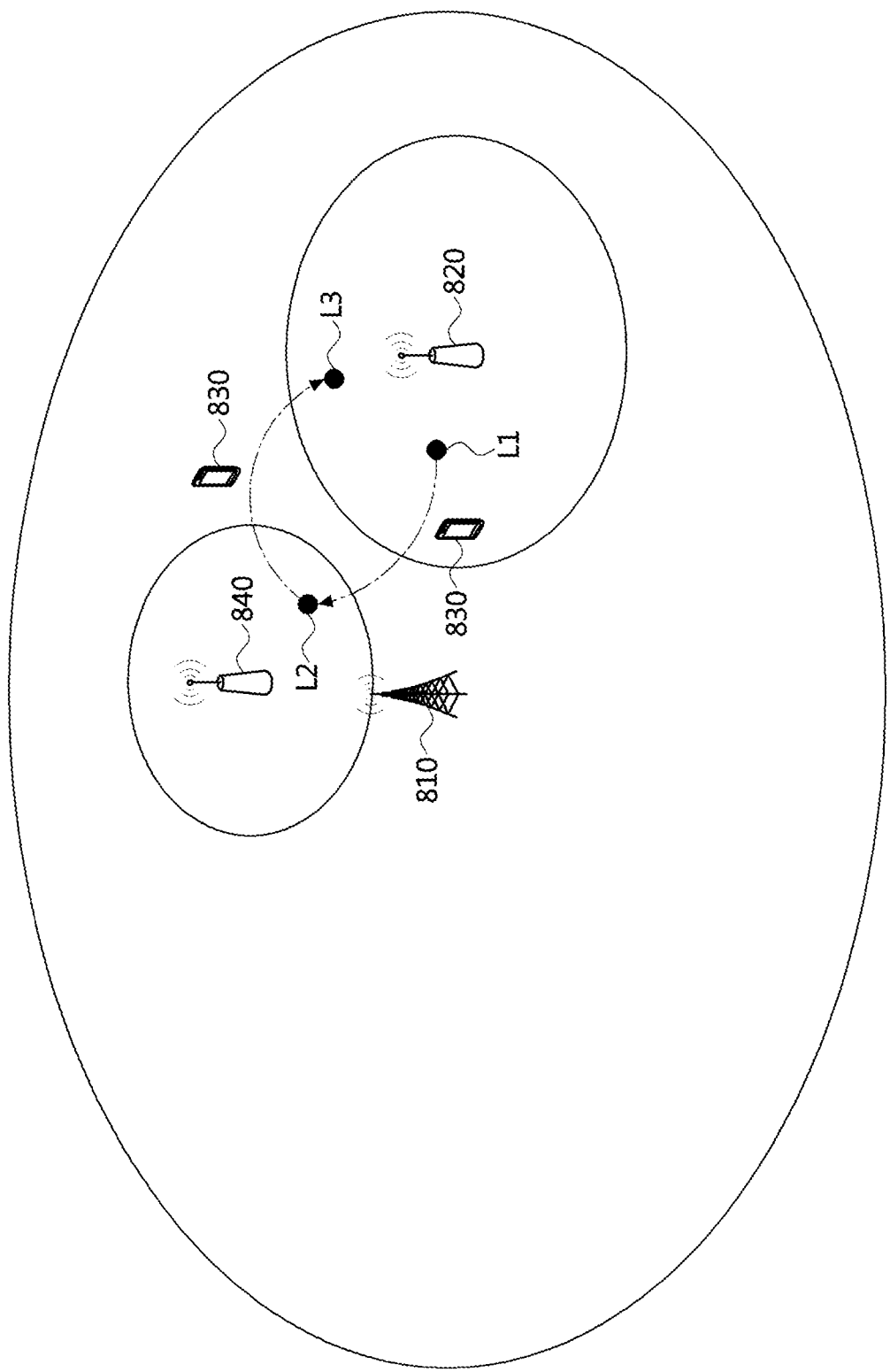
FIG. 8 is a conceptual diagram illustrating a first embodiment of a communication system.
Figure 9:
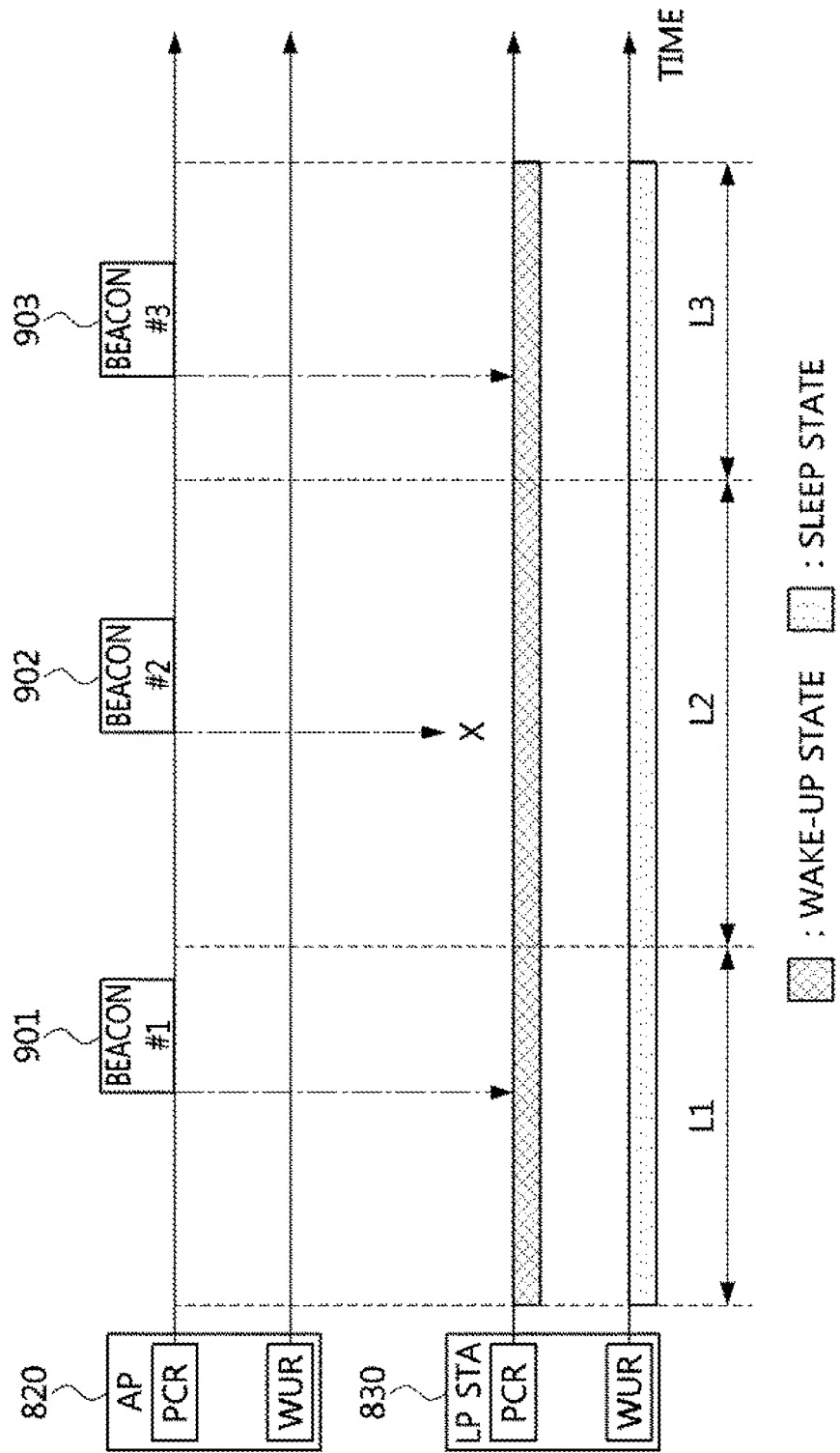
FIG. 9 is a timing diagram illustrating a first embodiment of an operation method of a communication node in the communication system shown in FIG. 8.

FIG. 8 is a conceptual diagram illustrating a first embodiment of a communication system, and FIG. 9 is a timing diagram illustrating a first embodiment of an operation method of a communication node in the communication system shown in FIG. 8.

Referring to FIGS. 8 and 9, a communication system may include a base station 810, an access point 820, a low-power STA 830, and the like. The base station 810 may support a 4G communication protocol (e.g., LTE communication protocol, LTE-A communication protocol, etc.), a 5G communication protocol (e.g., NR communication protocol), or the like. The access point 820 may support a WLAN communication protocol (e.g., a communication protocol defined in the IEEE 802.11 standard).

The access point 820 may be configured the same as or similar to the low-power STA 500 shown in FIG. 5. For example, the access point 820 may include a baseband processor, a PCR, an antenna, a memory, an input interface unit, an output interface unit, a WUR, and the like. The low-power STA 830 may support a 4G communication protocol, a 5G communication protocol, a WLAN communication protocol, and the like. The low-power STA 830 may be configured the same as or similar to the low-power STA 500 shown in FIG. 5. For example, the low-power STA 830 may include a baseband processor, a PCR, an antenna, a memory, an input interface unit, an output interface unit, a WUR, and the like.

The low-power STA 830 may have mobility and the area where the low-power STA 830 is located may change as the low-power STA 830 moves. For example, the low-power STA 830 may move from L1 to L2 and from L2 to L3. When the low-power STA 830 is located at L1, the low-power STA 830 may be located within the coverage of the access point 820. When the low-power STA 830 is located at L2, the low-power STA 830 may be located outside the coverage of the access point 820. When the low-power STA 830 is located at L3, the low-power STA 830 may again be located within the coverage of the access point 820.

Regardless of the location of the low-power STA 830, the PCR of the low-power STA 830 may always operate in the wake-up state, and the WUR of the low-power STA 830 may always operate in the sleep state. In this case, the operation mode of the low-power STA 830 may be as shown in Table 4 below. Alternatively, if the low-power STA 830 is a legacy station that does not support the WUR mode, the low-power STA 830 may operate in the same manner as the WUR always operating in the sleep state.

TABLE 4

| Location | Operation states | |
|---|---|---|
| | PCR | WUR |
| L1 | Wake-up state | Sleep state |
| L2 | Wake-up state | Sleep state |
| L3 | Wake-up state | Sleep state |

At L1, the low-power STA 830 can perform communications (e.g., transmission and reception of frames) with the access point 820 because the low-power STA 830 is located within the coverage of the access point 820. For example, the low-power STA 830 may receive a beacon frame #1 901 from the access point 820.

At L2, the low-power STA 830 cannot perform communications (e.g., transmission and reception of frames) with the access point 820 because the low-power STA 830 is located outside the coverage of the access point 820. For example, the low-power STA 830 may not receive a beacon frame #2 902 from the access point 820. In this case, the low-power STA 830 may perform a search procedure (e.g., a scanning procedure) for another access point, and the power consumption of the low-power STA 830 may be increased by performing the scanning procedure. Also, at L2, the low-power STA 830 can communicate with the base station 810 because the low-power STA 830 is located within the coverage of the base station 810. The communications between the low-power STA 830 and the base station 810 may be performed based on the 4G communication protocol or the 5G communication protocol.

At L3, since the low-power STA 830 has come back into the coverage of the access point 820, the low-power STA 830 can immediately perform communications (e.g., transmission and reception of frames) with the access point 820 without a large delay. For example, the low-power STA 830 may receive a beacon frame #3 903 from the access point 820.

Meanwhile, the operation state of each of the PCR and WUR of the low-power STA 830 may be changed according to the location of the low-power STA 830.

Figure 10:
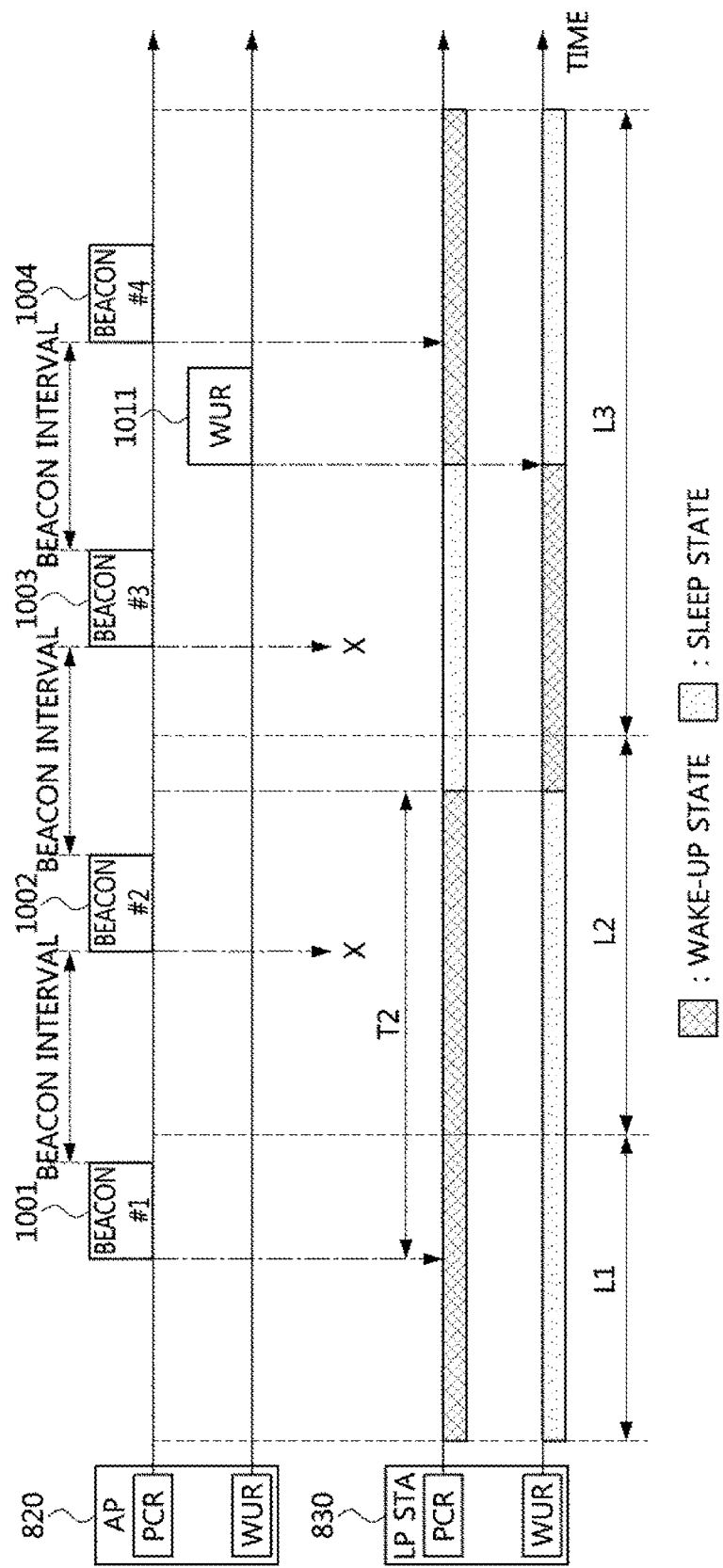
FIG. 10 is a timing diagram illustrating a second embodiment of an operation method of a communication node in the communication system shown in FIG. 8.

FIG. 10 is a timing diagram illustrating a second embodiment of an operation method of a communication node in the communication system shown in FIG. 8.

Referring to FIG. 10, an access point 820 (e.g., the PCR of the access point 820) may periodically transmit beacon frames 1001, 1002, 1003, and 1004. For example, the beacon frames 1001, 1002, 1003, and 1004 may be transmitted according to a beacon interval. The beacon frames 1001, 1002, 1003, and 1004 may be beacon frames defined in the IEEE 802.11a/b/g/n/ac/ax/ad/ay standard, and include at least one of information elements (e.g., operation parameters for the WUR mode) listed in Table 5 below.

TABLE 5

| Information element | Description |
| --- | --- |
| WUR beacon interval | Indicates a transmission period of the WUR beacon frames |
| WUR support | Indicates whether the access point supports the WUR mode |
| WUR duty-cycle operation duration | Indicates information on a duration (e.g., start time point and end time point) in which the low-power STA operation in a WUR duty-cycle mode |
| Operator ID | Indicates a service provider operating the access point |
| WUR channel (e.g., WUR band) | Indicates a channel (e.g., band) through which the WUR frame is transmitted |
| WUR duty-cycle operation | Indicates whether the WUR supports the duty-cycle mode |
| WUR duty-cycle duration period | Indicates information on a period of the duty-cycle duration |
| WUR duty-cycle ON/OFF ratio | Indicates information on an ON/OFF ratio in the duty-cycle duration |
| WUR QoS mode | Indicates a channel access scheme of the WUR frame |
| WUR PS-Poll (e.g., ACK) support | Indicates whether a PS-Poll (e.g., ACK) protocol for the WUR frame is supported |
| Wake-up delay | Indicates a time required for the operation state of the PCR to transition from OFF to ON (e.g., used for predicting a reception time point of the WUR PS-Poll frame, or used for configuring a timer for retransmission of the WUR frame) |
| WUR alive period | Indicates a WUR alive period for identifying whether the low-power STA is located within the coverage of the access point |

For example, the low-power STA 830 receiving the beacon frame #1 1001 may confirm a reception time of a WUR beacon frame 1011 based on the WUR beacon interval indicated by the beacon frame #1 1001. Also, the access point 820 may inform the low-power STA 830 of the WUR beacon interval through an access procedure between the access point 820 and the low-power STA 830 or a WUR negotiation procedure between the access point 820 and the low-power STA 830. For example, the access point 820 may transmit a probe request or response frame, an association request or response frame, or an action frame containing information indicating the WUR beacon interval.

Also, the low-power STA 830 may also identify whether the access point 820 supports the low-power STA 830 operating in the WUR mode based on a WUR indicator included in the beacon frames 1001, 1002, 1003, and 1004. For example, when the access point 820 supports the low-power STA 830 operating in the WUR mode, the low-power STA 830 can perform communications with the access point 820. On the other hand, when the access point 820 does not support the low-power STA 830 operating in the WUR mode, the low-power STA 830 may not communicate with the access point 820.

Also, the low-power STA 830 may identify the duration in which the low-power STA 830 operates in a WUR duty-cycle mode based on a WUR duty-cycle operation duration indicated by the beacon frames 1001, 1002, 1003, and 1004. Accordingly, the low-power STA 830 may operate in the WUR duty-cycle mode during the WUR duty-cycle operation duration, and may operate in a WUR continuous ON mode after the WUR duty-cycle operation duration ends.

Also, the low-power STA 830 may also identify a service provider that operates the access point 820 based on an operator identifier included in the beacon frames 1001, 1002, 1003, and 1004. For example, the low-power STA 830 may communicate with the access point 820 when the low-power STA 830 is connectable to the access point 820 operated by the service provider indicated by the operator identifier. On the other hand, when the low-power STA 830 is not connectable to the access point 820 operated by the service provider indicated by the operator identifier, the low-power STA 830 may not communication with the access point 820. Table 6 below shows the operation states of PCR and WUR at L1 to L3.

TABLE 6

| | Operation states | |
| --- | --- | --- |
| Location | PCR | WUR |
| L1 | Wake-up state | Sleep state |
| L2 (transitions to the WUR mode by applying T2) | Wake-up state Sleep state | Sleep state Wake-up state |
| L3 (transitions to the normal mode after receiving WUR frame) | Sleep state Wake-up state | Wake-up state Sleep state |

The operation parameters for the WUR mode listed in Table 5 may be determined through a separate signaling procedure performed by the PCR of the access point 820. For example, the PCR of the access point 820 may transmit to the low-power STA 830 a separate frame (e.g., a beacon frame, a probe request or response frame, an association request or response frame, etc.) including at least one of the operation parameters for the WUR mode described in Table 5.

Meanwhile, at L1, the low-power STA 830 (e.g., the PCR in the low-power STA 830) operating in the normal mode (e.g., PCR: wake-up state, WUR: sleep state) may receive the beacon frame #1 1001 from the access point 820, and identify the information included in the beacon frame #1 1001 (e.g., the information elements described in Table 5). Upon receiving the beacon frame #1 1001 from the access point 820, the low-power STA 830 may determine that the low-power STA 830 is located within the coverage of the access point 820.

Thereafter, the low-power STA 830 may move from L1 to L2. At the time of moving from L1 to L2, the low-power STA 830 may continue to operate in the normal mode because the low-power STA 830 does not know that the low-power STA 830 is located outside the coverage of the access point 820. When the beacon frame #2 1002 is not received from the access point 820 within a predetermined interval (e.g., a beacon timeout interval T2) from the reception end time of the beacon frame #1 1001, the low-power STA 830 may determine that the low-power STA 830 is located outside the coverage of the access point 820. In this case, the operation mode of the low-power STA 830 may transition from the normal mode to the WUR mode (e.g., PCR: sleep state, WUR: wakeup state). Thus, the low-power STA 830 may operate in the WUR mode. Here, the operation mode of the low-power STA 830 may transition from the normal mode to the WUR mode after a lapse of (the beacon timeout interval T2+mode transition time) from the reception end time of the beacon frame #1 1001.

Thereafter, the low-power STA 830 may move from L2 to L3. At the time of moving from L2 to L3, the low-power STA 830 may continue to operate in the WUR mode because the low-power STA 830 does not know that the low-power STA 830 is located within the coverage of the access point 820. Also, since the PCR of the low-power STA 830 operates in the sleep state, the low-power STA 830 operating in the WUR mode may not receive the beacon frame #3 1003 from the access point 820. Accordingly, the low-power STA 830 may continue to operate in the WUR mode even after the transmission time of the beacon frame #3 1003.

Meanwhile, the WUR of the access point 820 may transmit a WUR frame 1011. For example, the WUR of the access point 820 may transmit the WUR frame 1011 for communications with other low-power STAs. Here, the WUR frame 1011 may be configured to be the same as or similar to the WUR frame 700 shown in FIG. 7, and may be transmitted aperiodically. At L3, the WUR of the low-power STA 830 may receive the WUR frame 1011 from the access point 820. Upon receiving the WUR frame 1011 from the access point 820, the low-power STA 830 may determine that the low-power STA 830 is located within the coverage of the access point 820. In this case, the operation mode of the low-power STA 830 may transition from the WUR mode to the normal mode. Thus, the low-power STA 830 may operate in the normal mode. Here, the operation mode of the low-power STA 830 may transition from the WUR mode to the normal mode after a lapse of the mode transition time from the reception time of the WUR frame 1011. The low-power STA 830 operating in the normal mode may receive the beacon frame #4 1004 from the access point 820, and may communicate with the access point 820.

That is, even when the low-power STA 830 moved from L2 to L3, the low-power STA 830 may not identify that the low-power STA 830 is located outside the coverage of the access point 820 until the low-power STA 830 receives the WUR frame 1011 from the access point 820. Thus, the communications between the low-power STA 830 and the access point 820 may be delayed.

Meanwhile, the access point 820 (e.g., the WUR of the access point 820) may transmit periodic WUR frames (e.g., WUR beacon frames). In this case, the operation mode of the low-power STA 830 may be transited based on the periodic WUR frame as follows.

Figure 11:
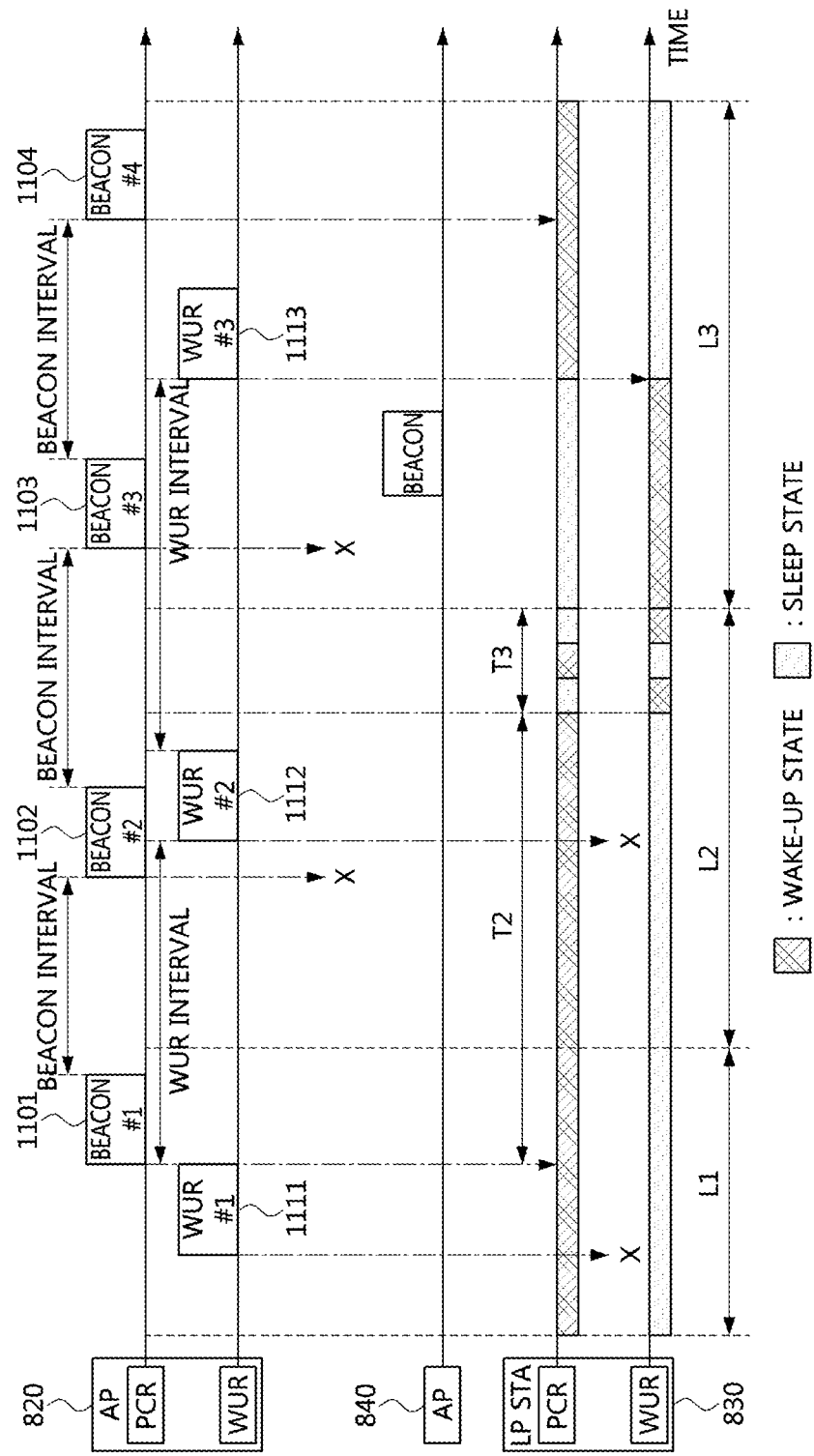
FIG. 11 is a timing diagram illustrating a third embodiment of an operation method of a communication node in the communication system shown in FIG. 8.

FIG. 11 is a timing diagram illustrating a third embodiment of an operation method of a communication node in the communication system shown in FIG. 8.

Referring to FIG. 11, the PCR of the access point 820 may periodically transmit beacon frames 1101, 1102, 1103, and 1104, and the WUR of the access point 820 may periodically transmit WUR frames 1111, 1112, and 1113. For example, the beacon frames 1101, 1102, 1103, and 1104 may be transmitted according to the beacon interval, and the WUR frames 1111, 1112, and 1113 may be transmitted according to a WUR interval. The WUR interval may be set longer than the beacon interval. The beacon frames 1101, 1102, 1103, and 1104 may be configured to be the same as or similar to the beacon frames 1001, 1002, 1003, and 1004 shown in FIG. 10. For example, the beacon frames 1101, 1102, 1103, and 1104 may include at least one of the information elements listed in Table 5. Further, the beacon frames 1101, 1102, 1103, and 1104 may further include information indicating the WUR interval.

The WUR frames 1111, 1112, and 1113 may be WUR beacon frames and may be transmitted in a broadcast manner. The WUR frames 1111, 1112, and 1113 may be configured to be the same as or similar to the WUR frame 700 shown in FIG. 7. Alternatively, the WUR frames 1111, 1112, and 1113 may include only the legacy preamble 710 and the WUR preamble 721. The WUR frames 1111, 1112, and 1113 may include information (e.g., an identifier) of a low-power STA that is a wake-up target. The identifier of the low-power STA may be a MAC address, an association identifier (AID), a partial AID (PAID), or the like. The operation parameters for the WUR mode described in Table 5 may be determined through a separate signaling procedure performed by the PCR of the access point 820. For example, the PCR of the access point 820 may transmit to the low-power STA 830 a separate frame (e.g., a beacon frame, a probe request or response frame, an association request or response frame, an action frame, etc.) including at least one of the operation parameters for the WUR mode described in Table 5.

Table 7 below shows the operation states of the PCR and the WUR at L1 to L3.

TABLE 7

| Location | Operation states | |
|---|---|---|
| | PCR | WUR |
| L1 | Wake-up state | Sleep state |
| L2 | Wake-up state | Sleep state |
| (transitions to the WUR | Sleep state | Wake-up state |
| mode by applying T2, and | Wake-up state | Sleep state |
| transitions to the normal | Sleep state | Wake-up state |
| mode by applying T3) | | |
| L3 | Sleep state | Wake-up state |
| (transitions to the normal | Wake-up state | Sleep state |
| mode after receiving | | |
| WUR frame) | | |

Meanwhile, at L1, the low-power STA 830 operating in the normal mode cannot receive the WUR frame #1 1111 from the access point 820 because the WUR operates in the sleep state. However, the PCR of the low-power STA 830 can receive the beacon frame #1 1101 from the access point 820 and identify the information (e.g., the information elements described in Table 5) contained in the beacon frame #1 1101. Upon receiving the beacon frame #1 1101 from the access point 820, the low-power STA 830 may determine that the low-power STA 830 is located within the coverage of the access point 820.

Thereafter, the low-power STA 830 may move from L1 to L2. At the time of moving from L1 to L2, the low-power STA 830 may continue to operate in the normal mode because the low-power STA 830 does not know that the low-power STA 830 is located outside the coverage of the access point 820. When the beacon frame #2 1002 is not received from the access point 820 within a predetermined interval (e.g., the beacon timeout interval T2) from the reception end time of the beacon frame #1 1001, the low-power STA 830 may determine that the low-power STA 830 is located outside the coverage of the access point 820. In this case, the operation mode of the low-power STA 830 may transition from the normal mode to the WUR mode. Thus, the low-power STA 830 may operate in the WUR mode. Here, the operation mode of the low-power STA 830 may transition from the normal mode to the WUR mode after a lapse of (the beacon timeout interval T2+mode transition time) from the reception end time of the beacon frame #1 1001. Also, since the low-power STA 830 operating in the WUR mode at L2 is located outside the coverage of the access point 820, the WUR of the low-power STA 830 may not receive the WUR frame #2 1112 from the access point.

Meanwhile, a PCR timeout period T3 may be configured so that the low-power STA 830 operating in the WUR mode at L2 can identify presence of a legacy access point 840. If a WUR frame is not received within the PCR timeout period T3 from the time when the WUR of the low-power STA 830 has transitioned from the sleep state to the wake-up state, the operation mode of the low-power STA 830 may transition from the WUR mode to the normal mode. Therefore, since the WUR frame has not been received from the access point 820 during the PCR timeout period T3, the operation mode of the low-power STA 830 may transition from the WUR mode to the normal mode after the end of the PCR timeout period T3. Meanwhile, the low-power STA 830 may transition back from the normal mode to the WUR mode if the presence of the legacy access point 840 is not identified.

The low-power STA 830 operating in the normal mode at L2 may receive a beacon frame from the legacy access point 840. Thereafter, the low-power STA 830 may communicate with the legacy access point 840. On the other hand, if the low-power STA 830 operating in the normal mode fails to receive a beacon frame from the legacy access point 840 within a predetermined interval, the operation mode of the low-power STA 830 may transition from the normal mode to the WUR mode again.

Thereafter, the low-power STA 830 may move from L2 to L3. At the time of moving from L2 to L3, the low-power STA 830 may continue to operate in the WUR mode because the low-power STA 830 does not know that the low-power STA 830 is located within the coverage of the access point 820. Also, since the PCR of the low-power STA 830 operates in the sleep state, the low-power STA 830 operating in the WUR mode may not receive the beacon frame #3 1003 from the access point 820. However, since the WUR of the low-power STA 830 operates in the wake-up state in the WUR mode, the WUR of the low-power STA 830 may receive a WUR frame #3 1113 from the access point 820.

Upon receiving the WUR frame #3 1013 from the access point 820, the low-power STA 830 may determine that the low-power STA 830 is located within the coverage of the access point 820. In this case, the operation mode of the low-power STA 830 may transition from the WUR mode to the normal mode. Thus, the low-power STA 830 may operate in the normal mode. Here, the operation mode of the low-power STA 830 may transition from the WUR mode to the normal mode after a lapse of the mode transition time from the reception time of the WUR frame #3 1113. The low-power STA 830 operating in the normal mode may receive the beacon frame #4 1104 from the access point 820, and may communicate with the access point 820.

That is, the low-power STA 830 may determine that the low-power STA 830 is located within the coverage of the access point 820 when the periodic WUR frame 1111, 1112, or 1113 is received, and accordingly may operate in the normal mode.

Meanwhile, the low-power STA 830 may move between coverages of a plurality of access points. In this case, the low-power STA 830 may operate as follows.

Figure 12:
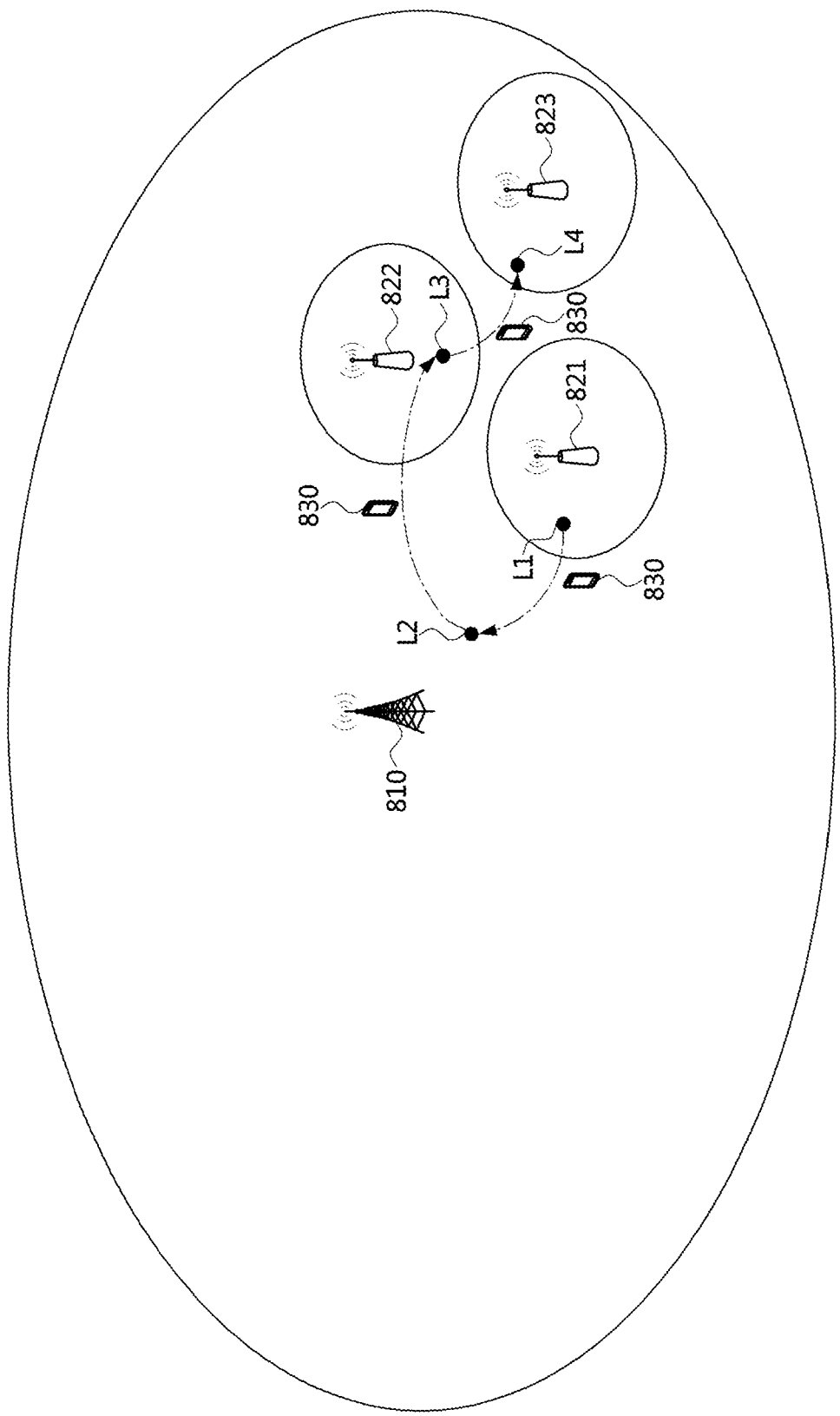
FIG. 12 is a conceptual diagram illustrating a second embodiment of a communication system.
Figure 13:
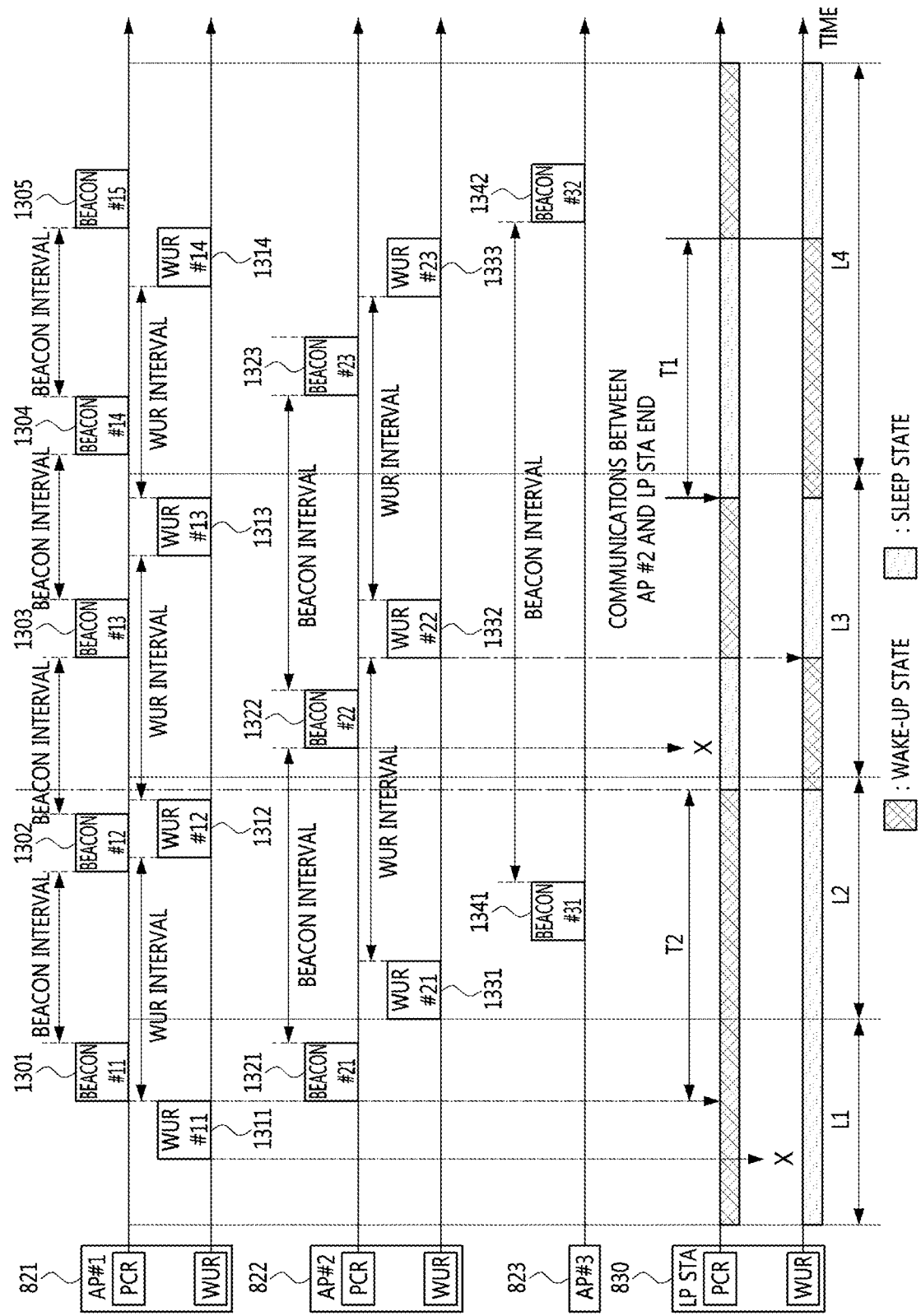
FIG. 13 is a timing diagram illustrating a first embodiment of an operation method of a communication node in the communication system shown in FIG. 12.

FIG. 12 is a conceptual diagram illustrating a second embodiment of a communication system, and FIG. 13 is a timing diagram illustrating a first embodiment of an operation method of a communication node in the communication system shown in FIG. 12.

Referring to FIGS. 12 and 13, a communication system may include a base station 810, an access point #1 821, an access point #2 822, an access point #3 823, a low-power STA 830, and the like. The base station 810 may support a 4G communication protocol (e.g., LTE communication protocol, LTE-A communication protocol, etc.), a 5G communication protocol (e.g., NR communication protocol), or the like. The access points 821, 822, and 823 may support a WLAN communication protocol (e.g., a communication protocol defined in the IEEE 802.11 standard).

The access points #1 and #2 (i.e., 821 and 822) may be configured the same as or similar to the low-power STA 500 shown in FIG. 5. For example, each of the access points #1 and #2 (i.e., 821 and 822) may include a baseband processor, a PCR, an antenna, a memory, an input interface unit, an output interface unit, a WUR, and the like. The access point #3 823 may be configured the same as or similar to the communication node 200 shown in FIG. 2. For example, the access point #3 823 may include a baseband processor, a transceiver, an antenna, a memory, an input interface unit, an output interface unit, and the like. Thus, the access point #3 823 may not be able to transmit a WUR frame (e.g., a wake-up packet, a WUR beacon frame, an alive frame, etc.).

The low-power STA 830 may support a 4G communication protocol, a 5G communication protocol, a WLAN communication protocol, or the like. The low-power STA 830 may be configured the same as or similar to the low-power STA 500 shown in FIG. 5. For example, the low-power STA 830 may include a baseband processor, a PCR, an antenna, a memory, an input interface unit, an output interface unit, a WUR, and the like.

Table 8 below shows the operation states of the PCR and the WUR at L1 to L4.

TABLE 8

| Location | Operation states | |
|---|---|---|
| | PCR | WUR |
| L1 | Wake-up state | Sleep state |
| L2 (transitions to the WUR mode by applying T2) | Wake-up state Sleep state | Sleep state Wake-up state |
| L3 (transitions to the normal mode after receiving WUR frame, and transitions to the WUR mode after finishing communications) | Sleep state Wake-up state Sleep state | Wake-up state Sleep state Wake-up state |
| L4 (transitions to the normal mode by applying T1) | Sleep state Wake-up state | Wake-up state Sleep state |

The low-power STA 830 may have mobility and the area where the low-power STA 830 is located may change as the low-power STA 830 moves. For example, the low-power STA 830 may move from L1 to L2, from L2 to L3, and from L3 to L4. When the low-power STA 830 is located at L1, the low-power STA 830 may be located within the coverage of the access point #1 821. When the low-power STA 830 is located at L2, the low-power STA 830 may be located outside the coverage of the access points 821, 822, and 823. When the low-power STA 830 is located at L3, the low-power STA 830 may again be located within the coverage of the access point #2 822. When the low-power STA 830 is located at L4, the low-power STA 830 may be located within the coverage of the access point #3 823.

The PCR of the access point #1 821 may periodically transmit beacon frames 1301, 1302, 1303, 1304, and 1305, and the WUR of the access point #1 821 may periodically transmit WUR frames 1311, 1312, 1313, and 1314. The PCR of the access point #2 822 may periodically transmit beacon frames 1321, 1322, and 1323, and the WUR of the access point #2 822 may periodically transmit WUR frames 1331, 1332, and 1333. The access point #3 823 may periodically transmit beacon frames 1341 and 1342.

The beacon frames 1301 to 1305, 1321 to 1323, and 1341 to 1342 may be transmitted according to the beacon interval, and the WUR frames 1311 to 1314 and 1331 to 1333 may be transmitted according to the WUR interval. The WUR interval may be set longer than the beacon interval. Alternatively, the WUR interval may be set equal to the beacon interval. The beacon frames 1301 to 1305, 1321 to 1323, and 1341 to 1342 may be configured to be the same as or similar to the beacon frames 1101, 1102, 1103, and 1104 shown in FIG. 11. For example, the beacon frames 1301 to 1305, 1321 to 1323, and 1341 to 1342 may include at least one of the information elements described in Table 5, and may further include the WUR interval. The WUR frames 1311 to 1314 and 1331 to 1333 may be configured to be the same as or similar to the WUR frames 1111, 1112, and 1113 shown in FIG. 11. For example, WUR frames 1311 to 1314 and 1331 to 1333 may include information (e.g., an identifier) of a low-power STA that is a wake-up target. The identifier of the low-power STA may be an MAC address, an AID, a PAID, or the like. The operation parameters for the WUR mode described in Table 5 may be determined through a separate signaling procedure performed by the PCR of the access points 821 to 823. For example, the PCRs of the access points 821 to 823 transmit to the low-power STA 830 a separate frame (e.g., a beacon frame, a probe request or access request, an association request or response request, an action frame, etc.) including at least one of the operation parameters for the WUR mode Response frame, connection request/response frame, action frame, etc.) listed in Table 5.

Meanwhile, at L1, the low-power STA 830 operating in the normal mode cannot receive the WUR frame #11 1311 from the access point #1 821 because the WUR operates in the sleep state. However, the PCR of the low-power STA 830 can receive the beacon frame #11 1301 from the access point #1 821 and identify the information (e.g., the information elements described in Table 5) contained in the beacon frame #11 1301. Upon receiving the beacon frame #11 1301 from the access point #1 821, the low-power STA 830 may determine that the low-power STA 830 is located within the coverage of the access point #1 821. On the other hand, the low-power STA 830 cannot receive the beacon frame #21 1321 from the access point #2 822 because the low-power STA 830 is located outside the coverage of the access point #2 822.

Thereafter, the low-power STA 830 may move from L1 to L2. At the time of moving from L1 to L2, the low-power STA 830 may continue to operate in the normal mode because the low-power STA 830 does not know that the low-power STA 830 is located outside the coverages of the access points 821, 822, and 823. When a legacy frame (e.g., the beacon frame #12 1302 of the access point #1 821) is not received from the access points 821, 822, and 823 within a predetermined interval (e.g., the beacon timeout interval T2) from the reception end time of the beacon frame #11 1301, the low-power STA 830 may determine that the low-power STA 830 is located outside the coverage of the access points 821, 822, and 823.

In this case, the operation mode of the low-power STA 830 may transition from the normal mode to the WUR mode. Thus, the low-power STA 830 may operate in the WUR mode. Here, the operation mode of the low-power STA 830 may transition from the normal mode to the WUR mode after a lapse of (the beacon timeout interval T2+mode transition time) from the reception end time of the beacon frame #11 1301. Also, at L2, since the low-power STA 830 is located outside the coverage of the access points 821, 822, and 823, the low-power STA 830 may not receive the WUR frame #21 1331 of the access point #2 822, the beacon frame #31 1341 of the access point #3 823, and the WUR frame #12 1312 of the access point #1 821.

Thereafter, the low-power STA 830 may move from L2 to L3. At the time of moving from L2 to L3, the low-power STA 830 may continue to operate in the WUR mode because low-power STA 830 does not know that low-power STA 830 is located within the coverage of the access point #2 822. Also, since the PCR of the low-power STA 830 operates in the sleep state, the low-power STA 830 operating in the WUR mode may not receive the beacon frame #22 1322 from the access point #2 822. However, since the WUR of the low-power STA 830 operates in the wake-up state in the WUR mode, the WUR of the low-power STA 830 may receive a WUR frame #22 1332 from the access point #2 822.

Upon receiving the WUR frame #22 1332 from the access point 820, the low-power STA 830 may determine that low-power STA 830 is located within the coverage of the access point #2 822. In this case, the operation mode of the low-power STA 830 may transition from the WUR mode to the normal mode. Thus, the low-power STA 830 may operate in the normal mode. Here, the operation mode of the low-power STA 830 may transition from the WUR mode to the normal mode after a lapse of the mode transition time from the reception time of the WUR frame #22 1332. The low-power STA 830 operating in the normal mode may communicate with the access point #2 822.

Meanwhile, when the communications between the low-power STA 830 and the access point #2 822 are terminated, the operation mode of the low-power STA 830 may transition from the normal mode to the WUR mode. Thereafter, the low-power STA 830 may move from L3 to L4. At the time of moving from L3 to L4, the low-power STA 830 may continue to operate in the WUR mode because low-power STA 830 does not know that low-power STA 830 is located within the coverage of the access point #3 823. Also, since the access point #3 823 does not transmit a WUR frame, the low-power STA 830 may not receive a WUR frame while the low-power STA 830 is located within the coverage of the access point #3 823. Therefore, since the low-power STA 830 continues to operate in the WUR mode while the low-power STA 830 is located within the coverage of the access point #3 823, the communications between the low-power STA 830 and the access point #3 823 may not be performed.

In order to solve this problem, a PCR timeout period T1 may be configured. When a WUR frame is not received within the PCR timeout period T1 from the time when the PCR of the low-power STA 830 transitions from the wake-up state to the sleep state, the operation mode of the low-power STA 830 may transition from the WUR mode to the normal mode. Therefore, since the WUR frame is not received from the access point #3 823 during the PCR timeout period T1, the operation mode of the low-power STA 830 may transition from the WUR mode to the normal mode after the end of the PCR timeout period T1.

The low-power STA 830 operating in the normal mode at L4 may receive the beacon frame #32 1342 from the access point #3 823, and identify information included in the beacon frame #32 1342 (e.g., the information elements described in Table 5). Thereafter, the low-power STA 830 may communicate with the access point #3 823. On the other hand, when the low-power STA 830 operating in the normal mode fails to receive the beacon frame #32 1342 from the access point #3 823 within a predetermined interval, the operation mode of the low-power STA 830 may transition from the normal mode to the WUR mode. On the other hand, since the low-power STA 830 is located outside the coverage of the access points #1 and #2 at L4, the low-power STA 832 may not receive the beacon frame #14 1304, the beacon frame #15 1305, the WUR frame #14 1314, the beacon frame #23 1323, and the WUR frame #23 1333.

An Alive Timer Based Operation Method of a Communication Node

In the WLAN-based communication system, an alive timer may be used to identify whether the low-power STA is located within the coverage of the access point. The initial value of the alive timer may be 0, and the end value of the alive timer may be expressed by the number of slots. The end value of the alive timer may be configured by the access point and may be shared by the access point and the low-power STA. The end value of the alive timer may be signaled to the low-power STA via the PCR or the WUR in the access procedure between the access point and the low-power STA. For example, the end value of the alive timer may be included in a beacon frame, a probe request or response frame, an association request and response frame, or an action frame. Alternatively, the end value of the alive timer may be signaled to the low-power STA via a wake-up packet (or, alive frame). An operation method of a communication node based on the alive timer may be as follows.

FIG. 14 is a timing chart illustrating a first embodiment of an operation method of a communication node in a WLAN-based communication system.

Referring to FIG. 14, a WLAN-based communication system may comprise an access point, a low-power STA, and the like. The access point and the low-power STA may be configured to be the same as or similar to the low-power STA 500 of FIG. 5.

When there are data to be transmitted to the low-power STA at the access point, the access point may generate a wake-up packet #1. The wake-up packet #1 may be configured to be the same as or similar to the WUR frame 700 shown in FIG. 7. For example, the wake-up packet #1 may request the low-power STA to operate in the normal mode, and may be modulated in the OOK scheme.

The access point may perform a carrier sensing operation for a predetermined period (e.g., a carrier sensing period). The predetermined period may be SIFS, PIFS, (DIFS+backoff period), (AIFS [AC_VO]+backoff period [AC_VO]), (AIFS [AC_VI]+backoff period [AC_VI]), (AIFS [AC_BE]+backoff period [AC_BE]), or (AIFS [AC_BK]+backoff period [AC_BK]). For example, when the data to be transmitted to the low-power STA is non-QoS data, the access point may perform the carrier sensing operation during (DIFS+backoff period). When the data to be transmitted to the low-power STA is QoS data, the access point may perform the carrier sensing operation during (AIFS+backoff period) according to the AC of the QoS data.

When a channel state is idle for the predetermined period, the access point may transmit a wake-up packet #1 to the low-power STA. The wake-up packet #1 may be transmitted in a broadcast manner, a multicast manner, or a unicast manner. When the wake-up packet #1 includes the legacy preamble and the WUR PPDU, the transmission bandwidth of the legacy preamble of the wake-up packet #1 may be 20 MHz and the transmission bandwidth of the WUR PPDU of the wake-up packet #1 may be 4 MHz, 8 MHz, or 16 MHz. On the other hand, when the channel state is busy for the predetermined period, the access point may perform the carrier sensing operation again.

Meanwhile, the WUR of the low-power STA operating in the WUR mode may perform a monitoring operation (e.g., a carrier sensing operation) to receive the wake-up packet #1. When the wake-up packet #1 is received from the access point, the operation mode of the low-power STA may transition from the WUR mode to the normal mode. Also, the low-power STA receiving the wake-up packet #1 may operate in the normal mode when the receiver address field of the wake-up packet #1 indicates the low-power STA. The low-power STA operating in the normal mode may identify the information included in the wake-up packet #1.

When the wake-up packet #1 is successfully received, the PCR of the low-power STA may transmit a WUR-Poll frame to the access point. For example, when the wake-up packet #1 includes an indicator requesting transmission of the WUR-Poll frame, the low-power STA may transmit the WUR-Poll frame to the access point. Also, the wake-up packet #1 may further include a multi-user (MU) indicator. The MU indicator may indicate whether a transmission for multiple users is to be performed after the wake-up packet #1. For example, the MU indicator set to 0 may indicate that a transmission for a single user (SU) is to be performed after the wake-up packet #1, and the MU indicator set to 1 may indicate that a transition for multiple users is to be performed after the wake-up packet #1. When the MU indicator included in the wake-up packet #1 is set to 0, the PCR of the low-power STA may transmit the WUR-Poll frame to the access point without receiving a trigger frame. On the other hand, when the MU indicator included in the wake-up packet #1 is set to 1, the PCR of the low-power STA may transmit the WUR-Poll frame by using a resource indicated by a trigger frame after receiving the trigger frame from the access point.

Meanwhile, the access point may generate a data frame and transmit the data frame to the low-power STA after a lapse of a transmission waiting period from the transmission end time of the wake-up packet. The transmission waiting period may be equal to or longer than the mode transition time of the low-power STA, and may start from the transmission end point of the wake-up packet #1. Therefore, when the transmission waiting period has elapsed from the transmission end point of the wake-up packet #1, the access point may determine that the low-power STA operates in the normal mode.

Also, the transmission waiting period may be set based on the carrier sensing period for the wake-up packet #1. For example, when the carrier sensing operation is performed during (DIFS+backoff period) for the transmission of the wake-up packet #1, the transmission waiting period may be set to (DIFS+backoff period) or (SIFS+DIFS+backoff period). When the carrier sensing operation is performed during (AIFS+backoff period) for the transmission of the wake-up packet #1, the transmission waiting period may be set to (AIFS+backoff period) or (SIFS+AIFS+backoff period).

When the channel state is idle for the transmission waiting period, the access point may transmit the data frame to the low-power STA after the transmission waiting period. Alternatively, the access point may perform a carrier sensing operation after the end of the transmission waiting period, and may transmit the data frame to the low-power STA when the channel state is determined to be idle by the carrier sensing operation. When the channel state is busy for the transmission waiting period, the access point may reconfigure the transmission waiting period. The reconfigured transmission waiting period may be the same as the previous transmission waiting period. Alternatively, the transmission waiting period may be set based on the random access procedure. For example, a contention window for the reconfigured transmission waiting period may be twice a contention window for the previous transmission waiting period. The access point may perform a carrier sensing operation in the reconfigured transmission waiting period, and when the channel state is idle for the reconfigured transmission waiting period, the access point may transmit the data frame to the low-power STA.

Also, in order to prevent the channel from being occupied by other communication nodes in the transmission waiting period, the access point may repeatedly transmit the wake-up packet #1 (e.g., a part of signal of the wake-up packet #1) in the transmission waiting period. Alternatively, the access point may repeatedly transmit a dummy signal in the transmission waiting period. Alternatively, the access point may transmit a frame (e.g., a data frame for a legacy STA) for another STA in the transmission waiting period.

On the other hand, the PCR of the low-power STA may receive the data frame from the access point. When a decoding operation on the data frame is successfully completed, the PCR of the low-power STA may transmit an ACK frame to the access point in response to the data frame. The ACK frame may be transmitted after a lapse of SIFS from the reception end time of the data frame. When the ACK frame is received from the low-power STA, the access point may determine that the data frame has been successfully received at the low-power STA.

When the transmission and reception procedure of the data frame is completed, the access point and the low-power STA may start an alive timer at the end of the ACK frame, respectively. When there is no data to be transmitted to the low-power STA during a period corresponding to an expiry value of the alive timer (hereinafter referred to as an 'alive period'), the access point may transmit an alive frame before the end point of the alive period. The alive frame may be configured to be the same as or similar to the WUR frame 700 shown in FIG. 7. Also, a wake-up packet or a WUR beacon frame may be used instead of the alive frame. Since the low-power STA determines that the low-power STA is located outside the coverage of the access point when a signal (e.g., frame) is not received from the access point during the alive period, the access point may transmit a signal (e.g., frame) before the end point of the alive period.

The alive frame may be transmitted to the low-power STA in a unicast manner. Alternatively, the alive frame may be transmitted in a broadcast manner or a multicast manner. Thus, all low-power STAs located within the coverage of the access point may receive the alive frame. The alive frame may include an expiry value of the alive timer, and the expiry value of the alive timer included in the alive frame may be different from the expiry value of the alive timer included in the wake-up packet #1.

When the low-power STA is located within the coverage of the access point, the low-power STA may receive an alive frame (or, a wake-up packet or a WUR beacon frame) from the access point, and upon receiving the alive frame (or, a wake-up packet or a WUR beacon frame), the low-power STA may determine that the low-power STA is located within the coverage of the access point. Also, even when the receiver address field of the alive frame (or, the wake-up packet or the WUR beacon frame) indicates another low-power STA, the low-power STA may determine that itself is located within the coverage of the access point. In this case, the low-power STA may reset a current value of the alive timer. For example, at the end of reception of the alive frame (or, the wake-up packet, or the WUR beacon frame), the low-power STA may set the value of the alive timer to 0 and restart the alive timer. In addition, when the alive frame (or, the wake-up packet or the WUR beacon frame) includes a new expiry value of the new alive timer, the low-power STA may use the new expiry value of the alive timer.

On the other hand, when there is data to be transmitted to the low-power STA, the access point may transmit a wake-up packet #2 to the low-power STA, and restart the alive timer at the transmission end time of the wake-up packet #2. The low-power STA may receive the wake-up packet #2 from the access point and may restart the alive timer at the reception end time of the wake-up packet #2. Also, when the wake-up packet #2 is received from the access point, the operation mode of the low-power STA may transition from the WUR mode to the normal mode.

After the transmission of the wake-up packet #2, the access point may transmit the data frame (not shown) to the low-power STA. When the low-power STA moves out of the coverage of the access point after receiving the wake-up packet #2, the low-power STA may not receive the data frame from the access point. For example, when the data frame (or, an alive frame, a wake-up packet, or a WUR beacon frame) is not received from the access point in an alive period starting from the reception end time of the wake-up packet #2, the low-power STA may determine that itself is located outside the coverage of the access point.

When it is determined that the low-power STA is located outside the coverage of the access point, the low-power STA may search for another access point. For example, the PCR of the low-power STA operating in the wake-up state may perform a scanning operation for another access point. In this case, the WUR of the low-power STA may provide information of another access point (e.g., MAC address, BSS ID, SSID, etc.) to the PCR of the low-power STA, and the PCR of the low-power STA may quickly perform the scanning operation based on the information of another access point obtained from the WUR of the low-power STA.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of an access point in a communication system, the operation method comprising:
generating, by the access point, a beacon frame including information indicating a wake-up radio (WUR) channel used for transmission of a WUR frame;
transmitting, by the access point, the beacon frame; and
transmitting, by the access point, the WUR frame in the WUR channel indicated by the beacon frame,
wherein a station performing communications with the access point operates in a normal mode or in a WUR mode, the station includes a primary connectivity radio (PCR) and a WUR, and the beacon frame further includes information indicating a duty-cycle duration of the WUR and information indicating a time required for transitioning an operation state of the PCR from a sleep state to a wake-up state.

2. The operation method according to claim 1, wherein the PCR included in the station operates in the wake-up state and the WUR included in the station operates in the wake-up state or the sleep state when the station operates in the normal mode, and the PCR operates in the wake-up state or the sleep state and the WUR operates in the wake-up state when the station operates in the WUR mode.

3. The operation method according to claim 2, wherein the beacon frame further includes at least one of information indicating whether the access point supports the WUR mode, information indicating whether the WUR supports a duty-cycle mode operation, information indicating an ON/OFF ratio in the duty-cycle duration of the WUR, information indicating a channel access scheme of the WUR frame, information indicating whether a power saving (PS)-Poll protocol is supported for the WUR frame, information indicating a WUR alive period for identifying whether the station is located within a coverage of the access point, or information indicating a service provider operating the access point.

4. An operation method of a station in a communication system, the operation method comprising:
receiving, by the station, a beacon frame including information indicating a wake-up radio (WUR) channel used for transmission of a WUR frame from an access point;
identifying, by the station, the WUR channel indicated by the beacon frame; and
performing, by the station, a monitoring operation for receiving the WUR frame in the WUR channel,
wherein the station operates in a normal mode or in a WUR mode, the station includes a primary connectivity radio (PCR) and a WUR, and the beacon frame further includes information indicating a duty-cycle duration of the WUR and information indicating a time required for transitioning an operation state of the PCR from a sleep state to a wake-up state.

5. The operation method according to claim 4, wherein the monitoring operation is performed to discover other access point.

6. The operation method according to claim 4, wherein the monitoring operation is performed using an identifier of other access point.

7. The operation method according to claim 6, wherein the identifier is a medium access control (MAC) address, a basic service set identifier (BSS ID), or a service set identifier (SSID).

8. The operation method according to claim 4, wherein the PCR included in the station operates in the wake-up state and the WUR included in the station operates in the wake-up state or the sleep state when the station operates in the normal mode, and the PCR operates in the wake-up state or the sleep state and the WUR operates in the wake-up state when the station operates in the WUR mode.

9. The operation method according to claim 8, wherein the beacon frame further includes at least one of information indicating whether the access point supports the WUR mode, information indicating whether the WUR supports a duty-cycle mode operation, information indicating an ON/OFF ratio in the duty-cycle duration of the WUR, information indicating a channel access scheme of the WUR frame, information indicating whether a power saving (PS)-Poll protocol is supported for the WUR frame, information indicating a WUR alive period for identifying whether the station is located within a coverage of the access point, or information indicating a service provider operating the access point.

* * * * *